(12) United States Patent
Lee et al.

(10) Patent No.: US 10,855,819 B2
(45) Date of Patent: **\*Dec. 1, 2020**

(54) MOBILE TERMINAL

(71) Applicant: LG ELECTRONICS INC., Seoul (KR)

(72) Inventors: Haklim Lee, Seoul (KR); Jongbeom Han, Seoul (KR)

(73) Assignee: LG ELECTRONICS INC., Seoul (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 16/808,729

(22) Filed: Mar. 4, 2020

(65) Prior Publication Data

US 2020/0204662 A1   Jun. 25, 2020

Related U.S. Application Data

(63) Continuation of application No. 16/065,366, filed as application No. PCT/KR2016/002031 on Feb. 29, 2016, now Pat. No. 10,623,537.

(30) Foreign Application Priority Data

Dec. 24, 2015   (KR) .......................... 10-2015-0186098

(51) Int. Cl.
*H04M 1/02*   (2006.01)
*G06F 1/16*   (2006.01)

(52) U.S. Cl.
CPC ........ *H04M 1/0214* (2013.01); *G06F 1/1641* (2013.01); *G06F 1/1652* (2013.01); *G06F 1/1681* (2013.01); *H04M 1/02* (2013.01); *H04M 1/0216* (2013.01); *H04M 1/0268* (2013.01)

(58) Field of Classification Search
CPC ........................... G06F 1/1652; H04M 1/0237
USPC ............ 361/679.56, 679.03, 749; 455/575.1, 455/557, 566; 349/150
See application file for complete search history.

(56) References Cited

U.S. PATENT DOCUMENTS

| | | | |
|---|---|---|---|
| 7,818,038 B2 * | 10/2010 | Huang | H04M 1/0237 379/433.12 |
| 8,195,256 B2 | 6/2012 | Matsushima et al. | |
| 8,593,061 B2 * | 11/2013 | Yamada | H01L 27/3293 313/503 |
| 8,651,915 B2 * | 2/2014 | Irmler | A63H 33/26 273/239 |
| 9,552,018 B2 * | 1/2017 | Sato | G06F 1/1656 |

(Continued)

FOREIGN PATENT DOCUMENTS

| | | |
|---|---|---|
| EP | 2765479 A2 | 1/2014 |
| KR | 10-2014-0005453 A | 1/2014 |

(Continued)

*Primary Examiner* — Kiet M Doan
(74) *Attorney, Agent, or Firm* — Birch, Stewart, Kolasch & Birch, LLP

(57) ABSTRACT

A mobile terminal includes a body having a plurality of bodies, positioned in a specific state between a first state in which the plurality of bodies are flat and a second state in which the plurality of bodies are folded; a flexible display positioned on one side of the body; and a hinge assembly having a guide shaft coupled to the plurality of bodies. Further, the guide shaft comprises a plurality of curved portions in which at least one curvature is different from at least another curvature.

19 Claims, 30 Drawing Sheets

(56) References Cited

U.S. PATENT DOCUMENTS

| | | | |
|---|---|---|---|
| 2003/0234897 A1* | 12/2003 | Ozawa | G02F 1/133615 |
| | | | 349/65 |
| 2006/0044396 A1* | 3/2006 | Miyashita | H04N 5/2252 |
| | | | 348/207.99 |
| 2010/0011291 A1 | 1/2010 | Nurmi | |
| 2010/0246103 A1 | 9/2010 | Visser et al. | |
| 2014/0043263 A1* | 2/2014 | Park | G06F 3/0418 |
| | | | 345/173 |
| 2014/0111954 A1 | 4/2014 | Lee et al. | |
| 2015/0233162 A1 | 8/2015 | Lee et al. | |
| 2015/0241925 A1 | 8/2015 | Seo et al. | |
| 2015/0253884 A1* | 9/2015 | Hwang | G06F 3/041 |
| | | | 345/173 |
| 2015/0257290 A1 | 9/2015 | Lee | |

FOREIGN PATENT DOCUMENTS

| | | |
|---|---|---|
| KR | 10-2015-0099383 A | 8/2015 |
| KR | 10-2015-0099677 A | 9/2015 |

\* cited by examiner (a)

(b)

(a)

(b)

(a)

(b)

(a)

(b)

(a)

(b)

MOBILE TERMINAL

CROSS-REFERENCE TO RELATED APPLICATIONS

This Application is a Continuation of co-pending U.S. patent application Ser. No. 16/065,366 filed on Jun. 22, 2018, which is the National Phase of PCT International Application No. PCT/KR2016/002031 filed on Feb. 29, 2016, which claims the priority benefit under 35 U.S.C. § 119(a) to Korean Patent Application No. 10-2015-0186098 filed on Dec. 24, 2015, all of which are hereby expressly incorporated by reference into the present application.

BACKGROUND OF THE INVENTION

Field of the Invention

The present disclosure relates to a mobile terminal capable of guiding the movement of a flexible display by introducing a curved portion unique to the present disclosure into a guide shaft.

Discussion of the Related Art

Terminals may be classified into mobile/portable terminals and stationary terminals according to their mobility. Furthermore, mobile terminals may be divided into handheld terminals and vehicle mounted terminals according to whether or not it can be directly carried by a user.

The functions of mobile terminals have been diversified. For example, the functions may include data and voice communication, photographing and video shooting through a camera, voice recording, playing a music file through a speaker system, and displaying an image or video on a display unit. Some terminals further include an electronic game play function or perform a multimedia player function. In particular, in recent years, mobile terminals may receive multicast signals that provide visual content such as broadcast, video or television programs.

As it becomes multifunctional, for example, such a terminal is allowed to capture still images or moving images, play music or video files, play games, receive broadcast and the like, so as to be implemented as an integrated multimedia player.

In order to support and enhance the functions of the terminal, the improvement of structural or software elements of the terminal may be taken into consideration.

SUMMARY OF THE INVENTION

An object of the present disclosure is to solve the above-mentioned problems and other problems. Another object of the present disclosure is to provide a mobile terminal capable of guiding the movement of a flexible display by introducing a curved portion unique to the present disclosure into a guide shaft.

In order to accomplish the foregoing and other objects, according to an aspect of the present disclosure, there is disclosed a mobile terminal, including a body including a plurality of bodies, positioned in a specific state between a first state in which the plurality of bodies are flat and a second state in which the plurality of bodies are folded; a flexible display positioned on one side of the body; a back cover positioned on the other side of the body; and a hinge assembly having a guide shaft coupled to the plurality of bodies, wherein the guide shaft includes a plurality of curved portions in which at least one curvature is different from at least another curvature.

The hinge assembly may include at least one head positioned between the plurality of bodies, and at least a partial region of the curved portion may be formed at a position overlapping with at least a partial region of the head in a width direction of the mobile terminal.

The plurality of curved portions may include first, second, and third curved portions, and the second curved portion may be positioned between the first and third curved portions, and a curvature of the second curved portion may be larger than that of the first and third curved portions.

The plurality of curved portions may include first, second, and third curved portions, and the first curved portion may be positioned farther from the center region of the mobile terminal than the second and third curved portions, and when changed from the first state to the second state, the flexible display may be brought into contact with the first curved portion and then brought into contact with the second and third curved portions.

The plurality of curved portions may form an escape region in which the guide shaft is recessed in a thickness direction of the mobile terminal.

At least part of the flexible display may be changed from the first state to the second state, and the position thereof may be moved to the escape region.

When the position of the body is changed from the first state to the second state, at least a partial region of the body covered by the back cover may be uncovered.

At least a partial region of the flexible display may be uncovered to the outside by the exposure of at least a partial region of the body.

The mobile terminal may further include a bezel in an outer region of the flexible display, wherein the bezel includes a first bezel on one side of the flexible display, and a second bezel at a position opposite to the first bezel about the flexible display, and a width of the second bezel is larger than that of the first bezel, and at least a partial region of the second bezel is a transparent or translucent region.

When the position of the body is changed from the first state to the second state, at least a partial region of the body covered by the back cover may be uncovered and a partial region of the flexible display may be observed through the second bezel.

One of the plurality of bodies further may include at least one slider coupled to at least one region of the back cover to allow the back cover to move along a rear surface of the plurality of bodies according to a state change of the plurality of bodies.

One of the plurality of bodies further may include at least one sliding magnet magnetically attached to a contact region positioned in at least another region of the back cover.

The mobile terminal may further include a plate positioned between the flexible display and the body to support the flexible display in the first state, wherein the plate includes a plurality of rigid regions configured to support the flexible display, and a flexible region between the plurality of rigid regions.

The mobile terminal may further include a flexible cable configured to electrically connect an electronic part integrated in any one of the plurality of bodies to an electronic part integrated in another one of the plurality of bodies, wherein the flexible cable includes a coil region in which the flexible cable is unfolded in the first state and overlapped in the second state.

The mobile terminal may further include a plurality of magnet assemblies, wherein the plurality of magnet assemblies include at least one of a first magnet assembly disposed on an opposite side of each of the plurality of bodies to be close to each other in the first state, and a second magnet assembly disposed in an outer circumferential region of the flexible display to be close to each other in the second state.

In order to accomplish the foregoing and other objectives, there is disclosed a mobile terminal, including a body including a plurality of bodies, positioned in a specific state between a first state in which the plurality of bodies are flat and a second state in which the plurality of bodies are folded; a flexible display positioned on one side of the body; and a back cover positioned on the other side of the body, wherein when the position of the body is changed from the first state to the second state, at least a partial region of the body covered by the back cover is uncovered.

At least a partial region of the flexible display may be uncovered to the outside by uncovering at least a partial region of the body.

The mobile terminal may further include a bezel in an outer region of the flexible display, wherein the bezel includes a first bezel on one side of the flexible display, a second bezel at a position opposite to the first bezel about the flexible display, and a width of the second bezel is larger than that of the first bezel.

At least a partial region of the second bezel may be a transparent or translucent region.

When the position of the body is changed from the first state to the second state, at least a partial region of the body covered by the back cover may be uncovered and a partial region of the flexible display may be observed through the second bezel.

At least a partial region of the uncovered body may be a rear region of the body corresponding to at least a partial region of the second bezel.

One of the plurality of bodies may further include at least one slider coupled to at least one region of the back cover to allow the back cover to move along a rear surface of the plurality of bodies according to a state change of the plurality of bodies.

One of the plurality of bodies may further include at least one sliding magnet magnetically attached to a contact region positioned in at least another region of the back cover.

The mobile terminal may further include a hinge assembly having at least one head positioned between the plurality of bodies and a plurality of guide shafts, one side of which is rotatably coupled to the at least one head and the other side of which is respectively coupled to any one of the plurality of bodies.

A plurality of curved portions in which at least one curvature is different from at least another curvature may be formed in at least a partial region of the guide shaft.

At least a partial region of the guide shaft may form an escape region that accommodates a positional change of at least a part of the flexible display according to a positional change of the body.

The mobile terminal may further include a plate positioned between the flexible display and the body to support the flexible display in the first state, wherein the plate includes a plurality of rigid regions configured to support the flexible display, and a flexible region between the plurality of rigid regions.

The mobile terminal may further include a flexible cable configured to electrically connect an electronic part integrated in any one of the plurality of bodies to an electronic part integrated in another one of the plurality of bodies, wherein the flexible cable includes a coil region in which the flexible cable is unfolded in the first state and overlapped in the second state.

The mobile terminal may further include a plurality of magnet assemblies, wherein the plurality of magnet assemblies includes at least one of a first magnet assembly disposed on an opposite side of each of the plurality of bodies to be close to each other in the first state, and a second magnet assembly disposed in an outer circumferential region of the flexible display to be close to each other in the second state.

According to another aspect of the present disclosure, there is disclosed a mobile terminal, including a body including a plurality of bodies, positioned in a specific state between a first state in which the plurality of bodies are flat and a second state in which the plurality of bodies are folded; a flexible display positioned on one side of the body; a back cover disposed on the other side of the body; and a plurality of magnet assemblies having at least one of a first magnet assembly disposed on an opposite side of each of the plurality of bodies to be close to each other in the first state and a second magnet assembly disposed in an outer circumferential region of the flexible display to be close to each other in the second state.

The first magnet assembly may be disposed in mutually opposed edge regions of the plurality of bodies.

At least one of the plurality of magnet assemblies may be disposed to generate a repulsive force.

The magnet assembly includes a plurality of magnets arranged in a row, and a bracket made of a metal material having one side that is open to accommodate the plurality of magnets.

The mobile terminal may further include a hinge assembly having at least one head positioned between the plurality of bodies and a plurality of guide shafts, one side of which is rotatably coupled to the at least one head and the other side of which is respectively coupled to any one of the plurality of bodies.

A plurality of curved portions in which at least one curvature is different from at least another curvature may be formed in at least a partial region of the guide shaft.

When the position of the body is changed from the first state to the second state, at least a partial region of the body covered by the back cover may be uncovered.

At least a partial region of the flexible display may be uncovered to the outside by uncovering at least a partial region of the body.

The mobile terminal may further include a bezel in an outer region of the flexible display, wherein the bezel includes a first bezel on one side of the flexible display, and a second bezel at a position opposite to the first bezel about the flexible display, and a width of the second bezel is larger than that of the first bezel, and at least a partial region of the second bezel is a transparent or translucent region.

When the position of the body is changed from the first state to the second state, at least a partial region of the body covered by the back cover may be uncovered and a partial region of the flexible display may be observed through the second bezel.

The effects of a mobile terminal according to the present disclosure will be described as follows.

According to at least one of the embodiments of the present disclosure, there is an advantage that a curved portion unique to the present disclosure is introduced into the guide shaft to guide the movement of the flexible display.

Further scope of applicability of the present disclosure will become apparent from the detailed description given hereinafter. However, it should be understood that the detailed description and specific examples such as preferred embodiments of the invention are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENTS

Figure 1:
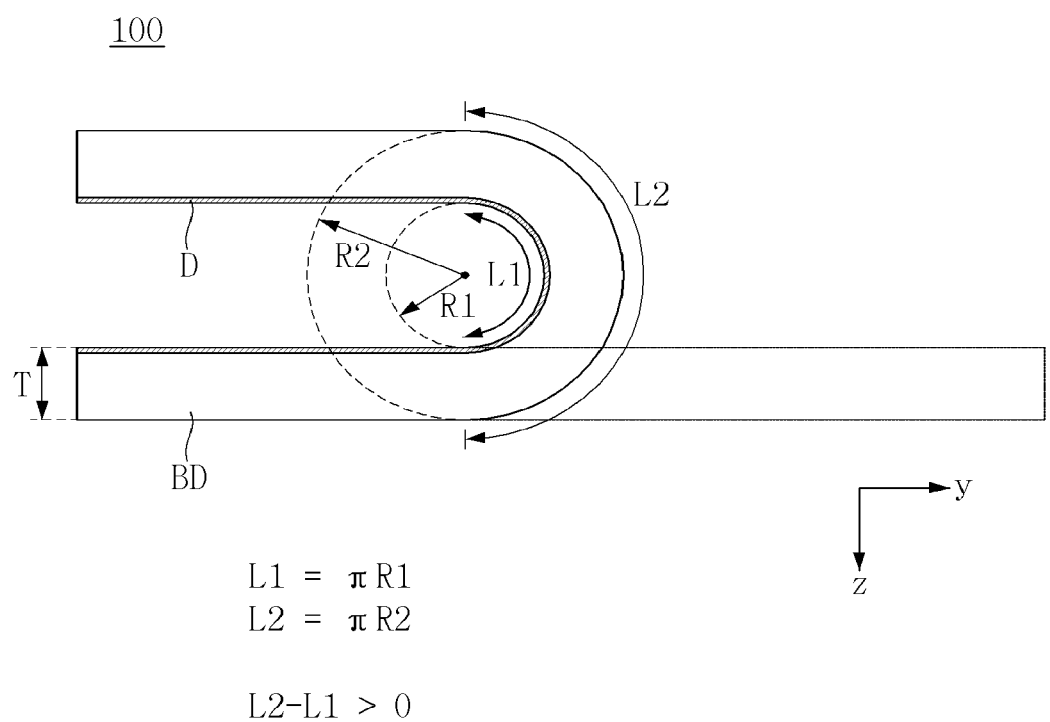
FIGS. 1 and 2 are views for explaining the operation of a mobile terminal according to an embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation as far as it represents a definitely different meaning from the context.

Terms "include" or "has" used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals.

Figure 2:
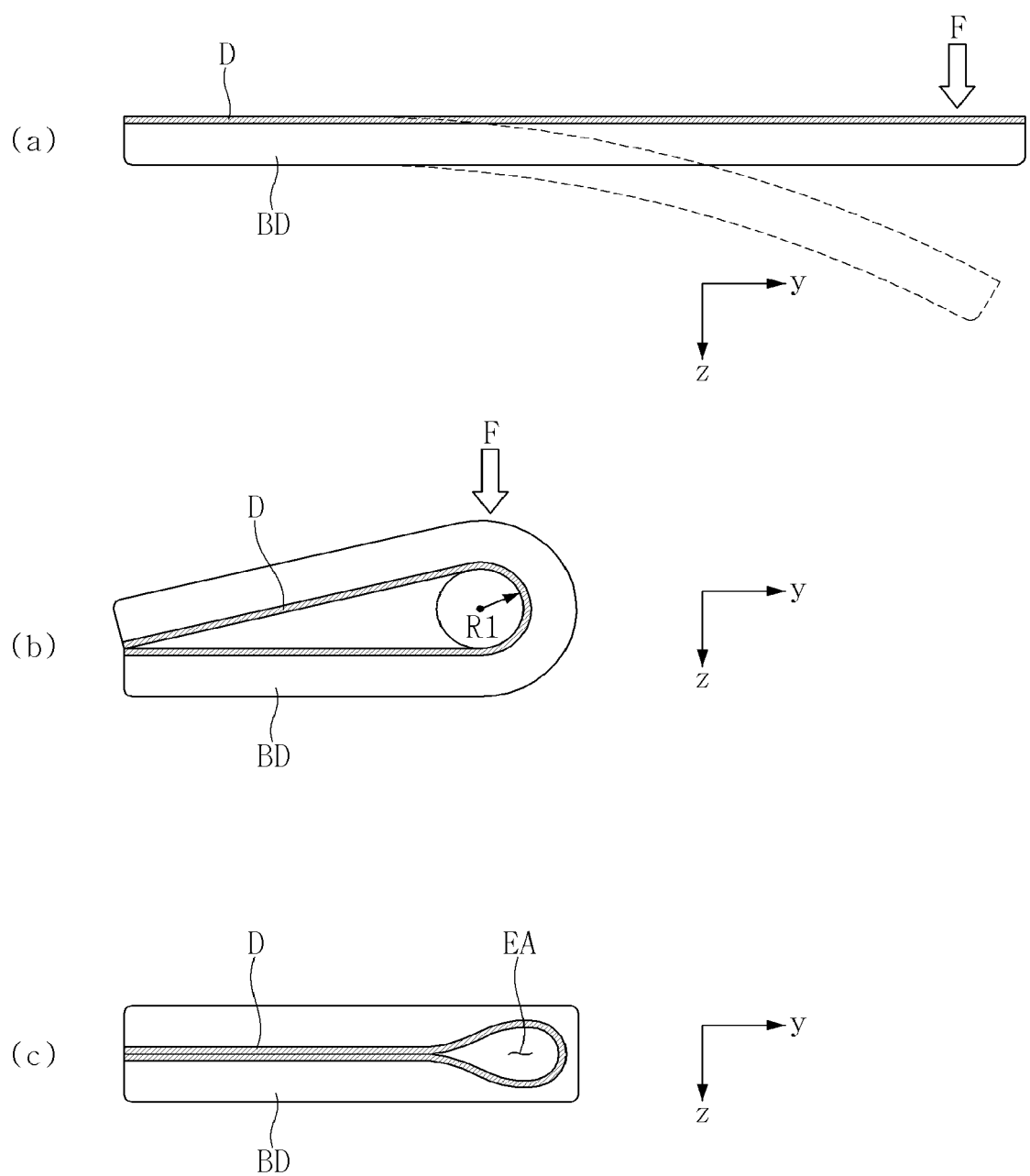

FIGS. 1 and 2 are views for explaining the operation of a mobile terminal according to an embodiment of the present disclosure.

As illustrated in the drawings, the mobile terminal 100 may have a foldable body (BD) shape. For example, it denotes that one end and the other end of the body (BD) may be folded in a close proximity and/or mutually contacting manner. At least one side of the body (BD) may be provided with a display (D).

As illustrated in FIG. 1, the display (D) may be formed substantially on an entire surface of at least one surface of the body (BD). In this respect, it may be different from a conventional folder phone. In other words, unlike a conventional folding mobile phone having a display region on a partial region of one side, it denotes that a single display is positioned from one end to the other end of the body (BD) in the mobile terminal 100 according to an embodiment of the present disclosure.

The display (D) may be in a flexible shape. In other words, when the body (BD) is folded, it denotes that the display (D) can also be folded accordingly. In this respect, it may have a different feature from a conventional folder phone. The flexible display (D) may be positioned substantially over an entire region of at least one side of the body (BD).

The mobile terminal 100 may have a predetermined thickness. In other words, it denotes that the mobile terminal may have a thickness of T in the Z direction. The thickness of the mobile terminal 100 may be a Z-directional sum of components in the mobile terminal 100 including the body (BD), the display (D), and the like.

The mobile terminal 100 may be in a first state (S1) or a second state (S2).

The first state (S1) may be a state in which the body (BD) is unfolded. For example, when the body (BD) is divided into a plurality of regions, a state in which the body (BD) divided into the plurality of regions is disposed on the same plane may be the first state (S1). In the first state (S1), the mobile terminal 100 may be seen in a stick shape.

The second state (S2) may be a state in which the body (BD) is bent. For example, a state in which one region of a body (BD) divided into a plurality of regions is folded to another region may be a second state (S2). In the second state (S2), a length of the mobile terminal 100 may be seen to be about half.

In the course of bending from the first state (S1) to the second state (S2), a difference in length may occur between an inner surface and an outer surface of the body (BD). The difference in length may occur due to a thickness (T) of the mobile terminal 100. In other words, due to the thickness (T), a difference may occur between a first radius (R1), which is a radius to an inner surface of the body (BD), and a second radius (R2), which is a radius to an outer surface of the body (BD). A length of the outer surface of the body (BD) may be larger than that of the inner surface of the body (BD) in the second state in which the body (BD) is folded due to a difference between the first and second radii (R1, R2). When the length of the outer surface of the body (BD) is larger than that of the inner surface of the body (BD), wrinkles may occur in the display (D) on the inner surface of the body (BD) when the body (BD) is folded.

In the second state (S2), the first radius (R1) of the inner side of the body (BD) may be required. This can be clearly understood in view of the fact that the display (D) positioned on the inner surface of the body (BD) may be damaged when the display (D) is folded flat. Therefore, the mobile terminal 100 may need a structure for maintaining the first radius (R1) of the inner surface of the body in the second state.

As illustrated in FIG. 2A, the mobile terminal 100 may resist an external force (F) when in the first state. For example, it denotes that the first state can be maintained without being deformed even when an external force (F) in the Z direction is applied.

As illustrated in FIG. 2B, the mobile terminal 100 may resist an external force (F) when in the second state. For example, it denotes that the first radius (R1) can be maintained without being deformed even when an external force (F) in the Z direction is applied. The maintenance of the first radius (R1) may be required to prevent the display (D) from being damaged or the like, as described above.

As illustrated in FIG. 2C, when the mobile terminal 100 is in the second state, the inner surfaces of a plurality of bodies (BD) may be mutually in contact or positioned in close proximity. In this regard, it is different from a case where the first radius (R1) is maintained. In a case where a plurality of bodies (BD) are folded and positioned adjacent to each other, at least a partial region of the display (D) may be moved into an escape region (ES). Therefore, even when the first radius (R1) is not maintained, it may be possible to prevent the display (D) from being folded.

FIGS. 3 through 15 are views for explaining the configuration and operation of a back cover of the mobile terminal according to an embodiment of the present disclosure.

As illustrated in the drawings, in the mobile terminal 100 according to an embodiment of the present disclosure, at least a part thereof may slidably move with respect to another part thereof. For example, it denotes that at least a part of a back cover (BC, or a rear cover) of the mobile terminal 100 slidably moves with respect to the body 200 of the mobile terminal 100. For example, it denotes that the back cover (BC) slidably move to uncover a part of the display (D) even in a second state that the mobile terminal 100 is folded.

Figure 3:
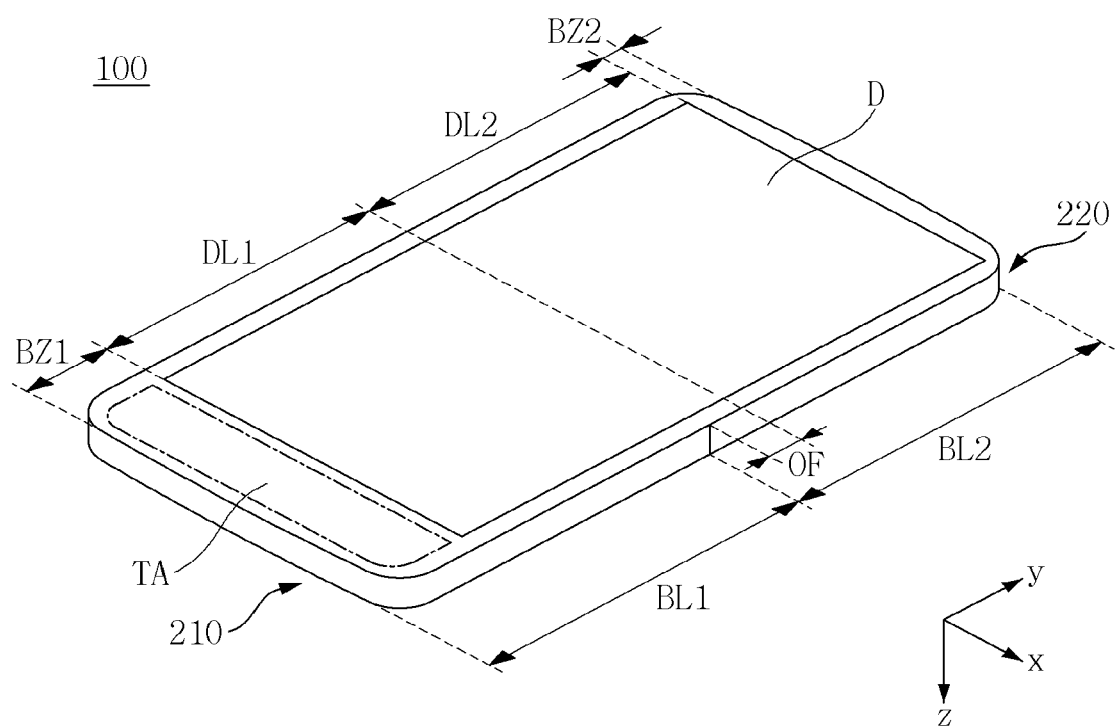
FIGS. 3 through 15 are views for explaining the configuration and operation of a back cover of the mobile terminal according to an embodiment of the present disclosure.
Figure 4:
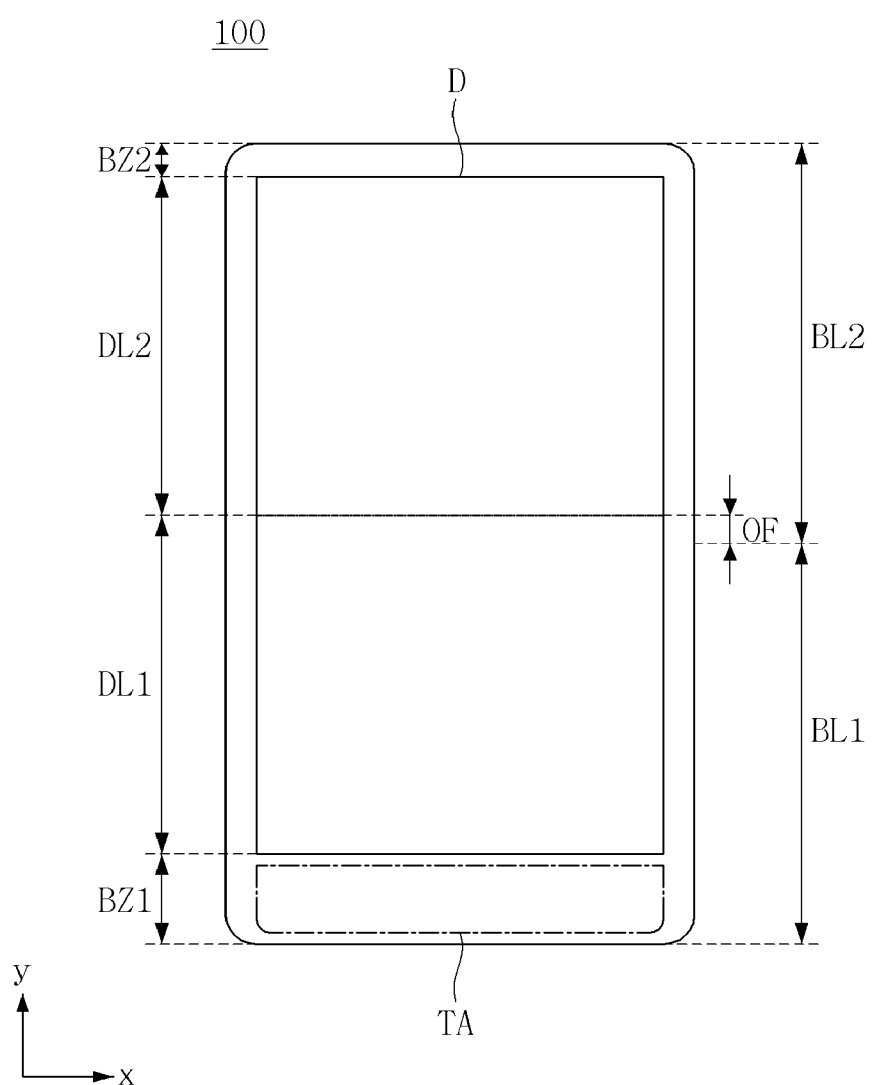

As illustrated in FIGS. 3 and 4, the mobile terminal 100 may be in a first state that the first and second bodies 210, 220 are positioned substantially side by side on the same plane.

The display (D) may be positioned on one side of the first and second bodies 210, 220. For example, it denotes that the first and second bodies 210, 220 can be positioned on a surface with the inner surface when folded. For example, the display (D) may be continuously located on the first and second bodies 210, 220.

The display (D) may be positioned offset (OF) from the center of the first and second bodies 210, 220. The first body 210 may have a first body length (BL1) and the second body 220 may have a second body length (BL2). In other words, the first and second bodies 210, 220 may be formed by the first and second body lengths (BL1, BL2) around a hinge assembly (not shown) connecting the first and second bodies 210, 220.

The display (D) may have a first display length (DL1) on one side and a second display length (DL2) on the other side with respect to the center of the display (D). The center of the display (D) may be offset from the center of the first and second bodies 210, 220.

The offset (OF) may be generated due to the location of the display (D). In other words, it may occur since the display (D) is positioned relatively at an upper side due to the fact that a size of the first bezel region (BZ1) on a lower side of the display (D) is larger than that of the second bezel region (BZ2) on an upper side of the display (D). At least a part of the first bezel region (BZ1) may be a transmission region (TA).

The transmission region (TA) may be made of a substantially transparent or translucent material. For example, the transparency of a portion corresponding to the first bezel region (BZ1) of the bezel around the display (D) may be higher than that of the other portions. For example, the transparency of at least a part of the first bezel region (BZ1) may be different from that of the other region.

A rear side of the transmission region (TA) may not be observed through the transmission region (TA) in a first state that the mobile terminal 100 is unfolded. For example, it denotes that the transmission region (TA) can be covered by the back cover (BC) in the first state. For the transmission region (TA), the rear side may be observed therethrough in a second state that the mobile terminal 100 is being folded and/or is folded.

Figure 5:
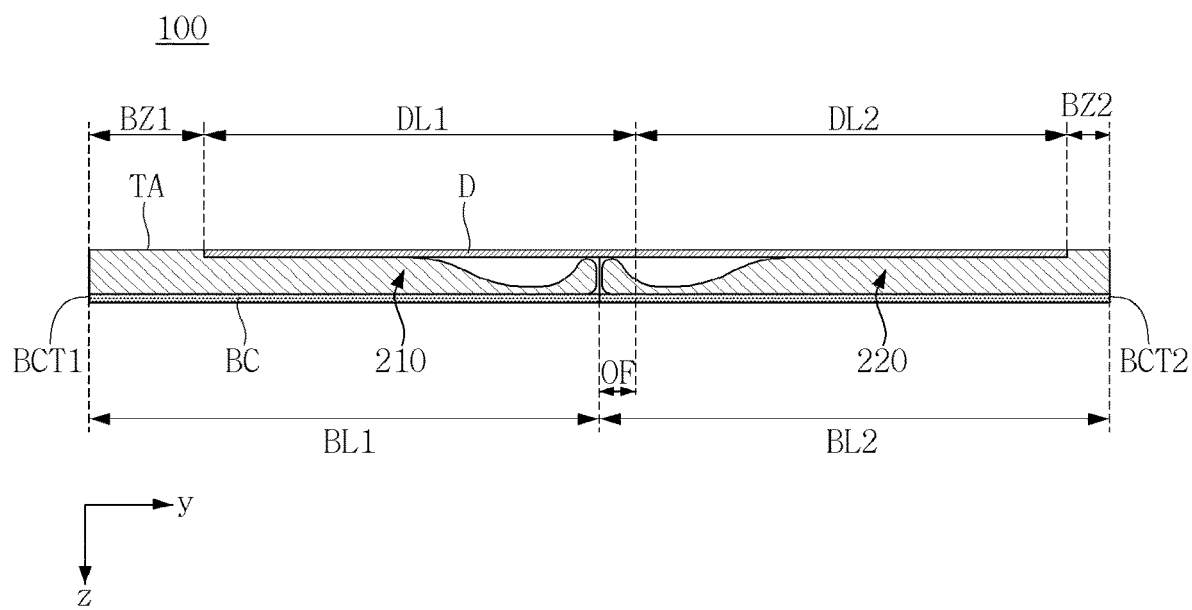
Figure 6:
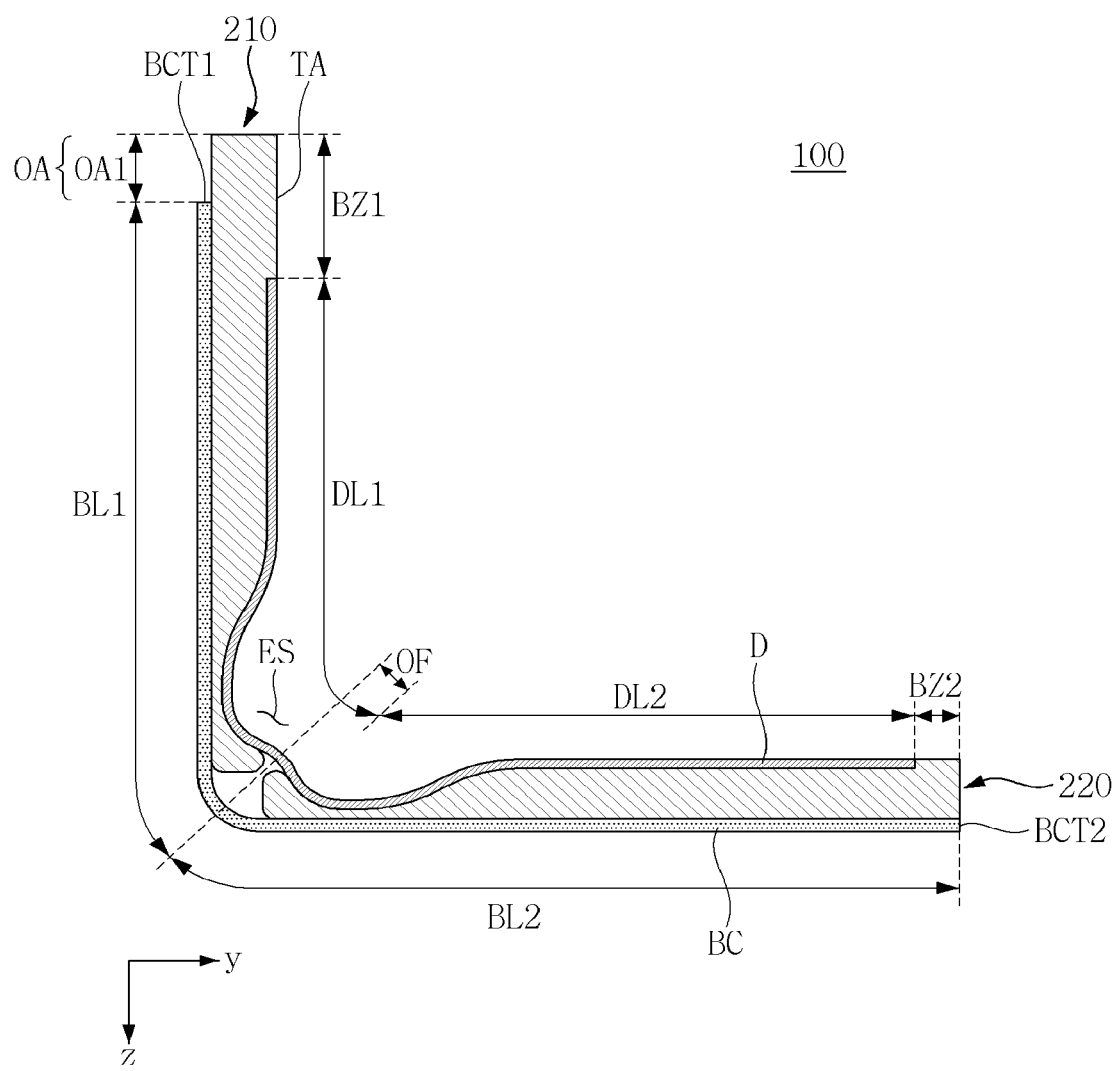
Figure 7:
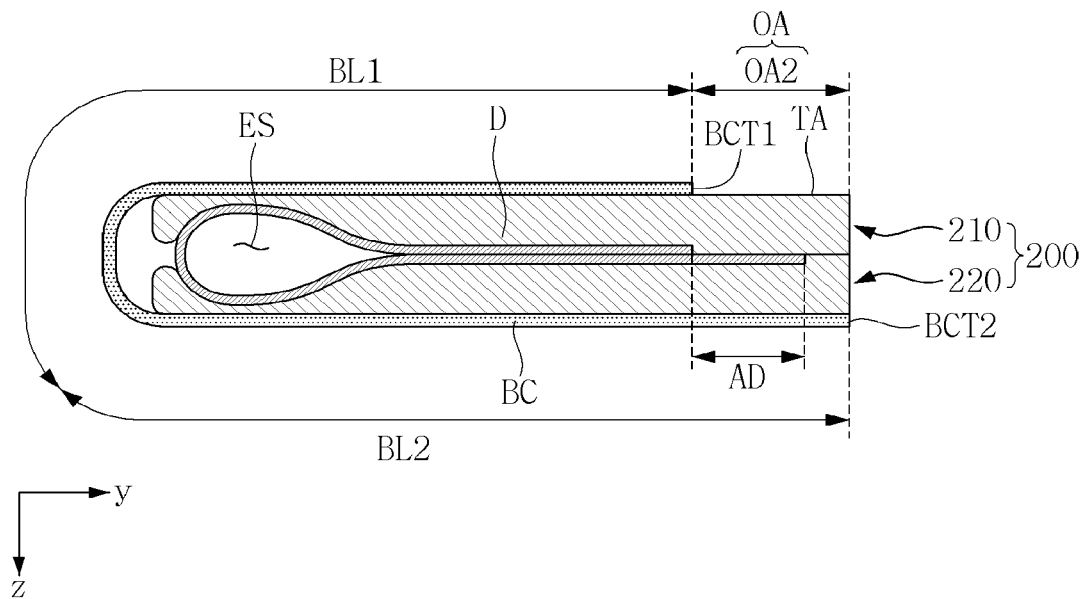

FIGS. 5 through 7 are views illustrating the operation of the mobile terminal 100 according to an embodiment of the present disclosure. As illustrated in the drawings, the mobile terminal 100 according to an embodiment of the present disclosure may observe at least a partial region of the display (D) through the transmission region (TA) when the mobile terminal is changed from the first state to the second state.

As illustrated in FIG. 5, the display (D) may be positioned on one side of the first and second bodies 210, 220 and the back cover (BC) is positioned on the other side of the first and second bodies 210, 220. In other words, it is seen that the display (D) and the back cover (BC) are positioned on one side and the other side, respectively, with respect to the first and second bodies 210, 220.

The display (D) may be offset (OF) with respect to the back cover (BC), as described above. In other words, the first bezel region (BZ1) may be larger than the second bezel region (BZ2). The first bezel region (BZ1) may be formed with a transmission region (TA).

The mobile terminal 100 may be in a first state. In other words, it denotes that the first and second bodies 210, 220 may be positioned on the same plane.

In the first state, a rear surface of the mobile terminal 100 may be covered by the back cover (BC). In other words, it denotes that the rear surface of the mobile terminal 100 may be in a state of being veiled by the back cover (BC). Therefore, in spite of the existence of the transmission region (TA), the rear side cannot be seen from the front side or the front side from the rear side through the transmission region (TA).

As illustrated in FIG. 6, the first and second bodies 210, 220 of the mobile terminal 100 may be in a bent state. Such a state may be a third state. In other words, it denotes that the first and second bodies 210, 220 are not in a completely unfolded state, and the first and second bodies 210, 220 are not in a completely folded state.

In the third state, the back cover (BC) may form an opening (OA). The opening (OA) may be generated by a difference in a moving distance between an inner side surface and an outer side surface of the first and second bodies 210, 220 due to a thickness of the first and second bodies 210, 220.

In the third state, the opening (OA) may form a first opening (OA1). In other words, it denotes that a first end portion (BCT1) of the back cover (BC) can slidably move on a rear surface of the first body 210 to be spaced apart from an end of the first body 210 by the first opening (OA1). When the first opening (OA1) is generated by a sliding movement of the back cover (BC), a region where the first opening (OA1) and the transmission region (TA) overlap with each other may be generated. When the first opening (OA1) overlaps with the transmission region (TA), the rear side may be observed from the front side or the front side from the rear side through the overlap region.

In a third state, at least a partial region of the display (D) may be moved to the escape region (ES). In other words, it denotes that a part of the display (D) on an inner surface of the first and second bodies 210, 220 can be bent into the escape region (ES) while forming the first opening (OA1) on an outer surface of the first and second bodies 210, 220 due to a thickness of the first and second bodies 210, 22. Bending to the escape region (ES) will be specifically described in the relevant portion.

As illustrated in FIG. 7, the mobile terminal 100 may be in a second state. In other words, the first and second bodies 210, 220 may be in a completely folded state. In other words, at least a part of the end regions of the first and second bodies 210, 220 may be in contact with each other.

In the second state, the opening (OA) may form a second opening (OA2). The second opening (OA2) may be larger than the first opening (OA1). In other words, it denotes that the first and second bodies 210, 220 are completely folded to maximize the size of the opening (OA).

An area of the second opening (OA2) may be substantially the same as that of the transmission region (TA). Alternatively, an entire area of the second region (OA2) may overlap with the transmission region (TA).

An image may be observed from an outside of the display (D) due to the second opening (OA2). In other words, it denotes that even though the first and second bodies 210, 220 are completely folded an image displayed in a partial region of the display (D) positioned inside the first and second bodies 210, 220 can be observed. For example, it denotes that an image displayed in an active region (AD) of the display (D) can be visually observed.

The controller 180 (see FIG. 28) may display an image only in the active region (AD) of the display (D) when in the second state. The controller 180 (see FIG. 28) may display an image only in the active region (AD) corresponding to the second opening (OA2) when in the second state. The controller 180 (see FIG. 28) may deactivate another portion of the display (D) and activate a portion corresponding to the second opening (OA2) when in the second state.

FIGS. 8 through 11 are views illustrating a sliding structure of the back cover (BC) of the mobile terminal 100 according to an embodiment of the present disclosure.

Figure 8:
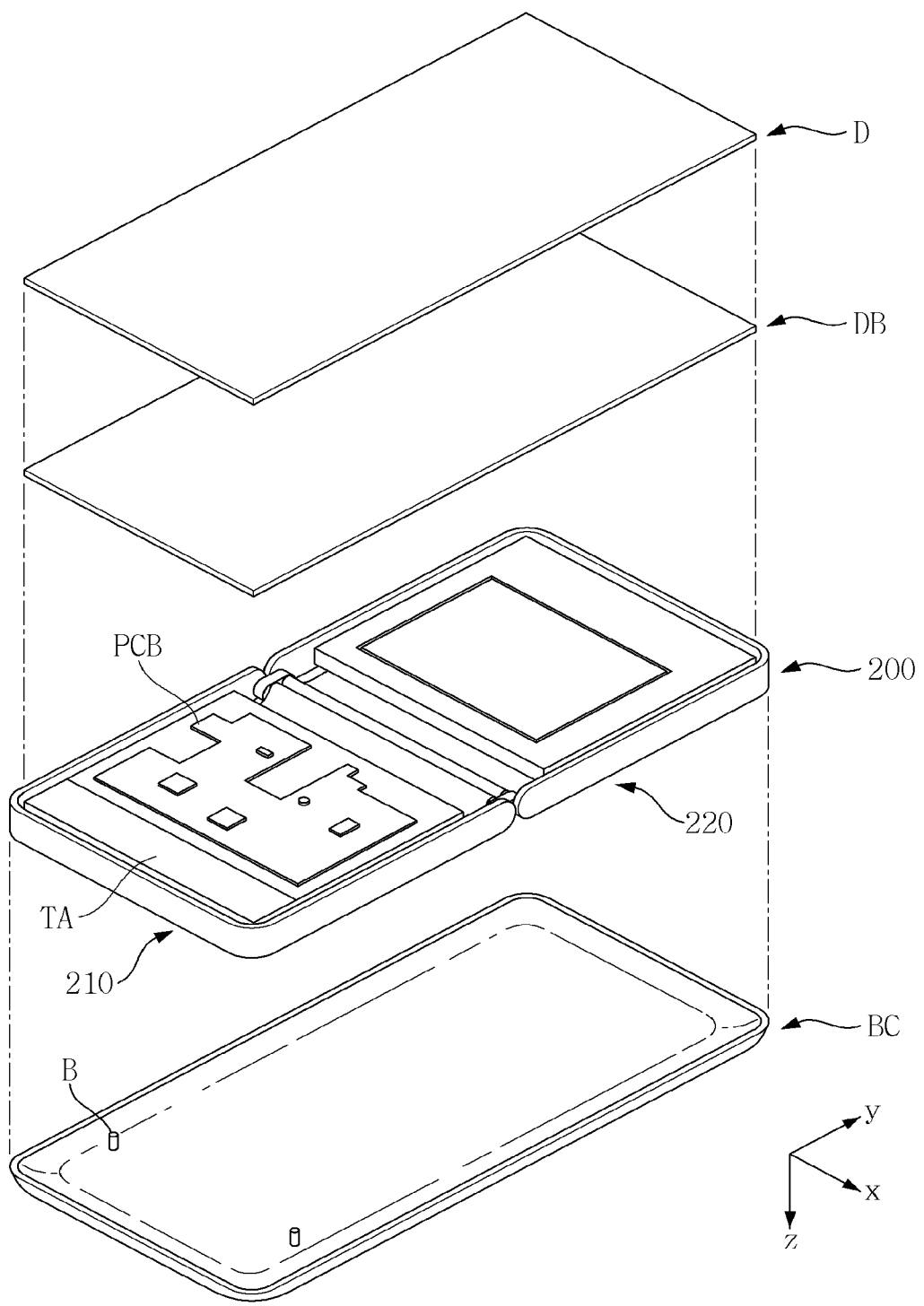

As illustrated in FIG. 8, the body 200 may include first and second bodies 210, 220. The transmission region (TA) may exist on one side of the first body 210.

The back cover (BC) may be positioned on a rear side of the body 200.

The display (D) may be positioned on a front side of the body 200.

A plate (DB) may be positioned between the display (D) and the body 200. The plate (DB) may support the display (D). The plate (DB) may include a plurality of regions. The plate (DB) including a plurality of regions may not prevent the mobile terminal 100 from being folded while supporting the display (D) when the mobile terminal 100 is in a first state. The detailed structure of the plate (DB) will be described in the relevant part.

Figure 9:
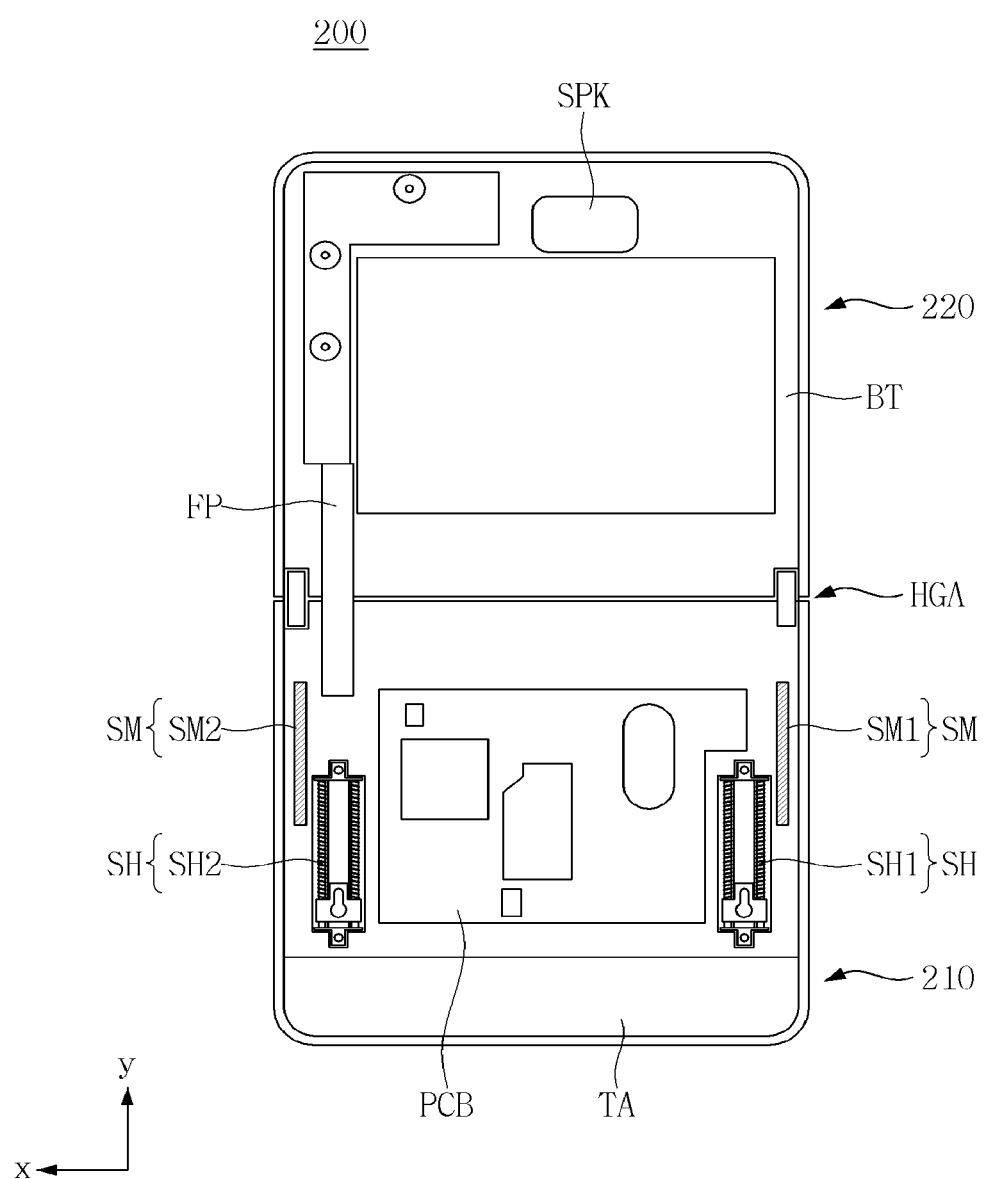

As illustrated in FIG. 9, a structure for sliding the back cover (BC) may exist on a rear surface of the body 200.

Various components required for the operation of the mobile terminal 100 may be integrated in the body 200. The body 200 may include a second body 220 to which at least a part of the back cover (BC) is fixed and a first body 210 where a sliding movement of the back cover (BC) occurs. A PCB (PCB) on which the controller 180 of the mobile terminal 100 is mounted may be positioned in the first body 210. In the second body 220, a battery (BT) may be positioned. A flexible cable (FP) may be connected between the first and second bodies 210, 220. The first and second bodies 210, 220 may be connected to each other to rotate with respect to each other by a hinge assembly (HGA). In the first body 210, a slider (SH) and a sliding magnet (SM) may be positioned.

The slider (SH) may be coupled to the back cover (BC). For a smooth folding operation of the mobile terminal 100, the back cover (BC) should slide in proportion to a degree of folding. Since the back cover (BC) is coupled to the slider (SH), the slider (SH) may store the kinetic energy of the back cover BC being slid. Therefore, due to the energy stored in the slider (SH) when the mobile terminal 100 returns to the first state again allows the back cover (BC) to return to an initial position.

The sliding magnet (SM) may be positioned in a region adjacent to the slider (SH). For example, it denotes that at least a part of the sliding magnet (SM) can overlap with the slider (SH) in a traverse direction (x direction).

The sliding magnet (SM) may prevent the lifting of the back cover (BC). As described above, the back cover (BC) may be coupled to the slider (SH). However, a coupling between the back cover (BC) and the slider (SH) may be limited to a specific limited point. The sliding magnet (SM) may be attached to an inner surface of the back cover (BC) in a longitudinal direction (y direction). The back cover (BC) may be provided with a magnet region (M) (see FIG. 12) corresponding to the sliding magnet (SM). The back cover (BC) may be brought into close contact with the body 200 by a magnetic force between the sliding magnet (SM) and the contact region (M) (see FIG. 12). In other words, it denotes that the sliding magnet (SM) can be magnetically attached to the contact region (M) (See FIG. 12).

Figure 10:
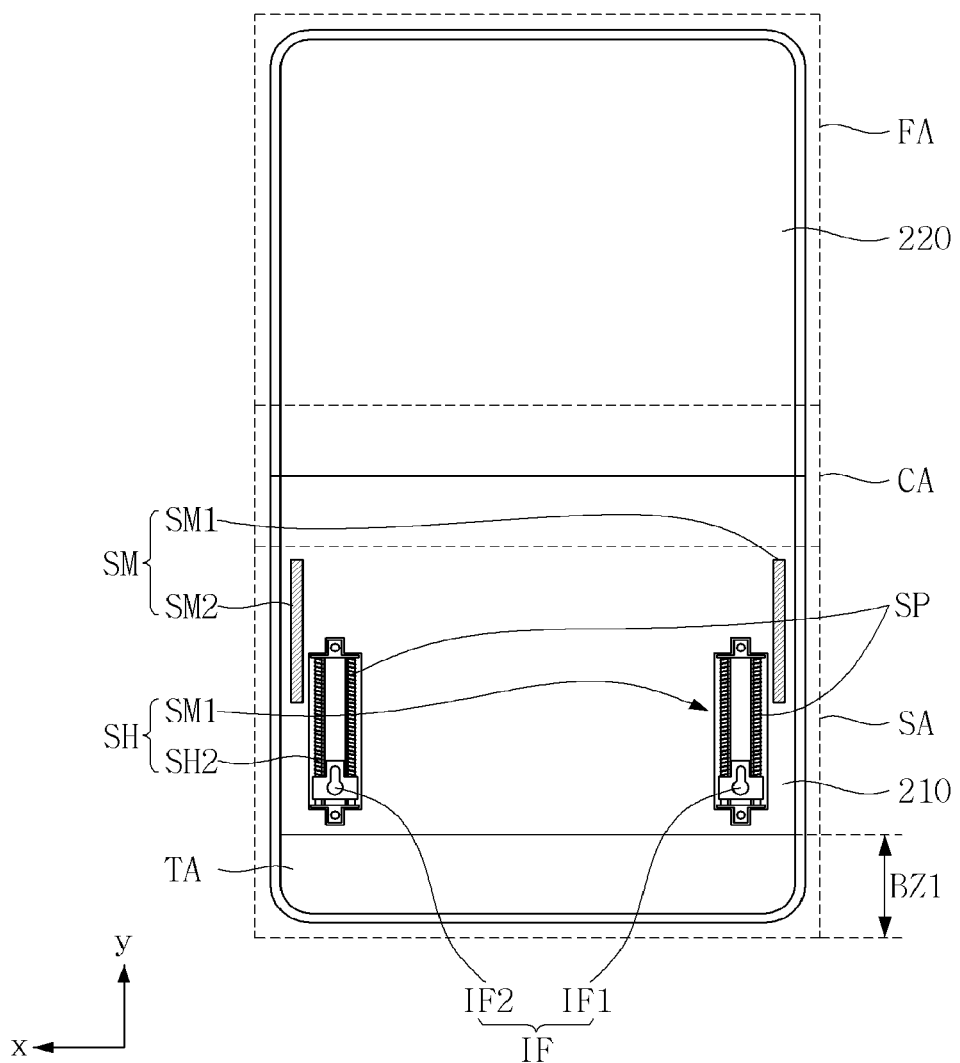

As illustrated in FIG. 10, the body 200 may be divided into a plurality of regions. For example, it denotes that the body 200 may include a fixed region (FA), a folding region (CA), and a sliding region (SA).

The fixed region (FA) may be provided on the second body 220. At least a partial region of the back cover (BC) may be coupled to the fixed region (FA).

The folding region (CA) may be a region where the first and second bodies 210, 220 move relative to each other by the hinge assembly (HGA) (see FIG. 9).

The sliding region (SA) may be a region in which the back cover (BC) move relative to the first body 210. In the sliding region (SA), a slider (SH) and a sliding magnet (SM) may be positioned.

Figure 11:
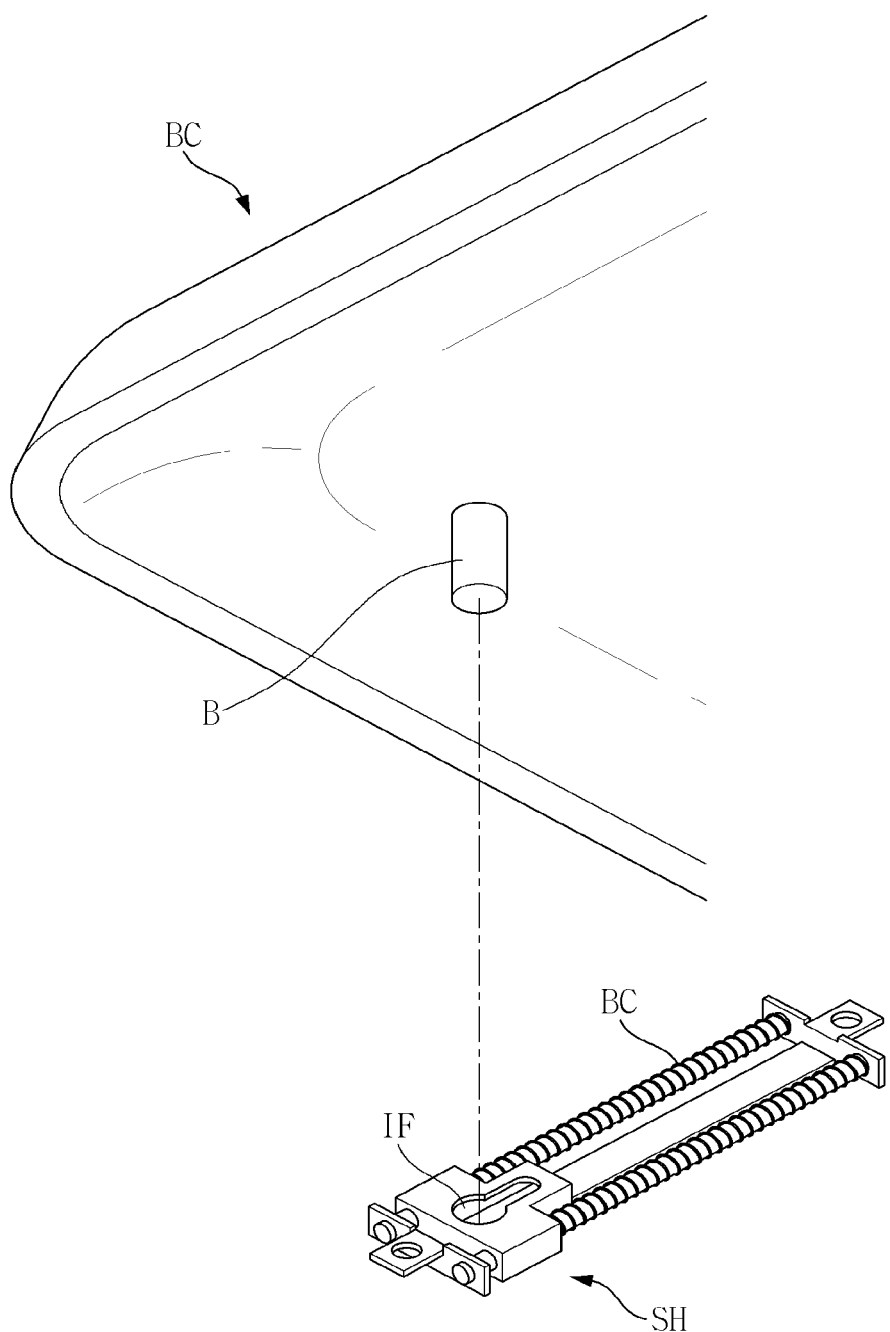

As illustrated in FIG. 11, a coupling protrusion (B) may be provided on an inner side of the back cover (BC). The coupling projection (B) may be coupled to an insertion port (IF) of the slider (SH). The insertion port (IF) may be supported by a spring (SP).

Figure 12:
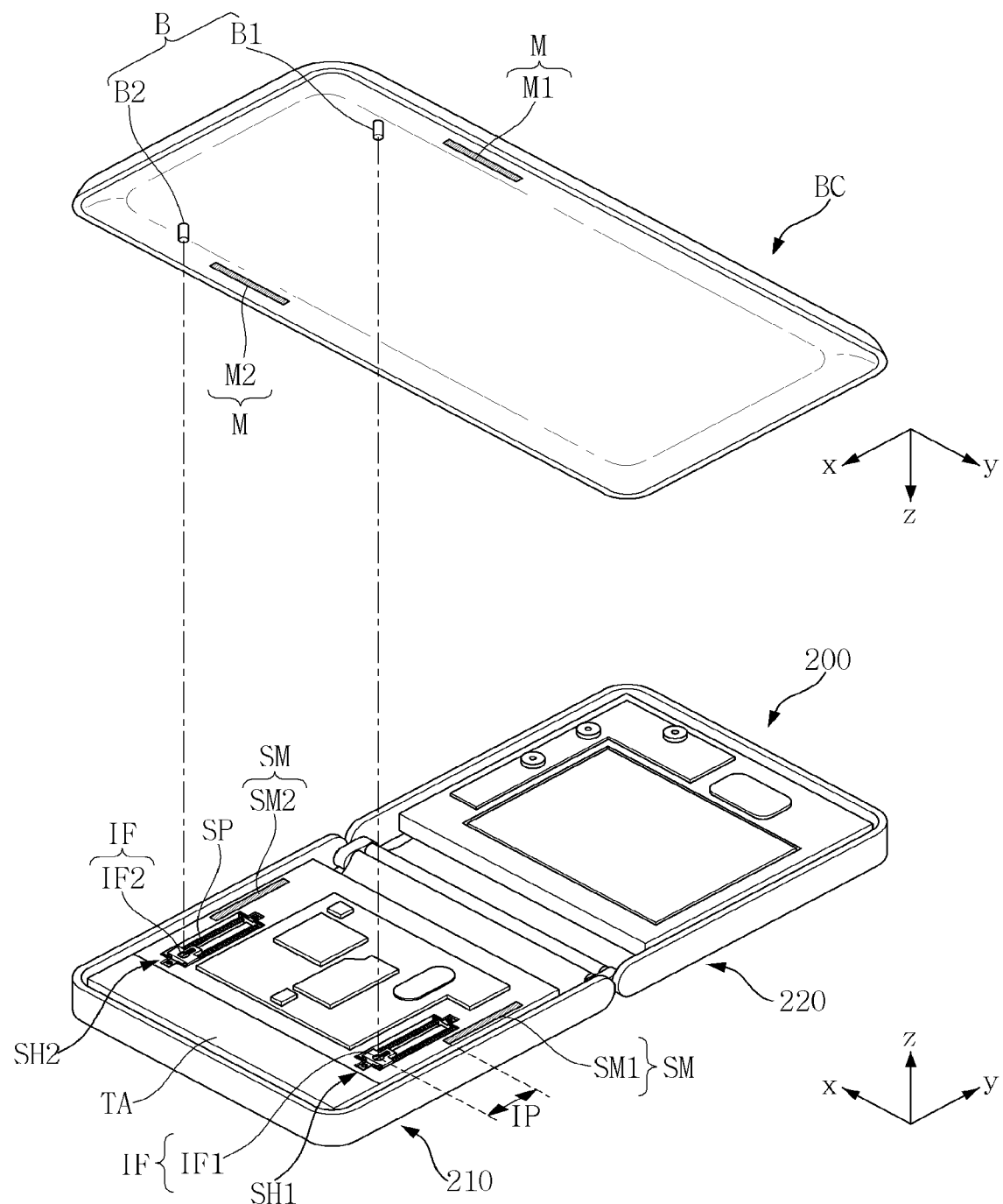

As illustrated in FIG. 12, the mobile terminal may be in a first state in which the first and second bodies 210, 220 are disposed side by side. In the first state, the first and second coupling protrusions (B1, B2) of the back cover (BC) may be coupled to the first and second insertion ports (IF1, IF2), respectively. In the first state, the first and second insertion ports (IF1, IF2) may be spaced by an initial distance (IP) from an end of the slider (SH).

Figure 13:
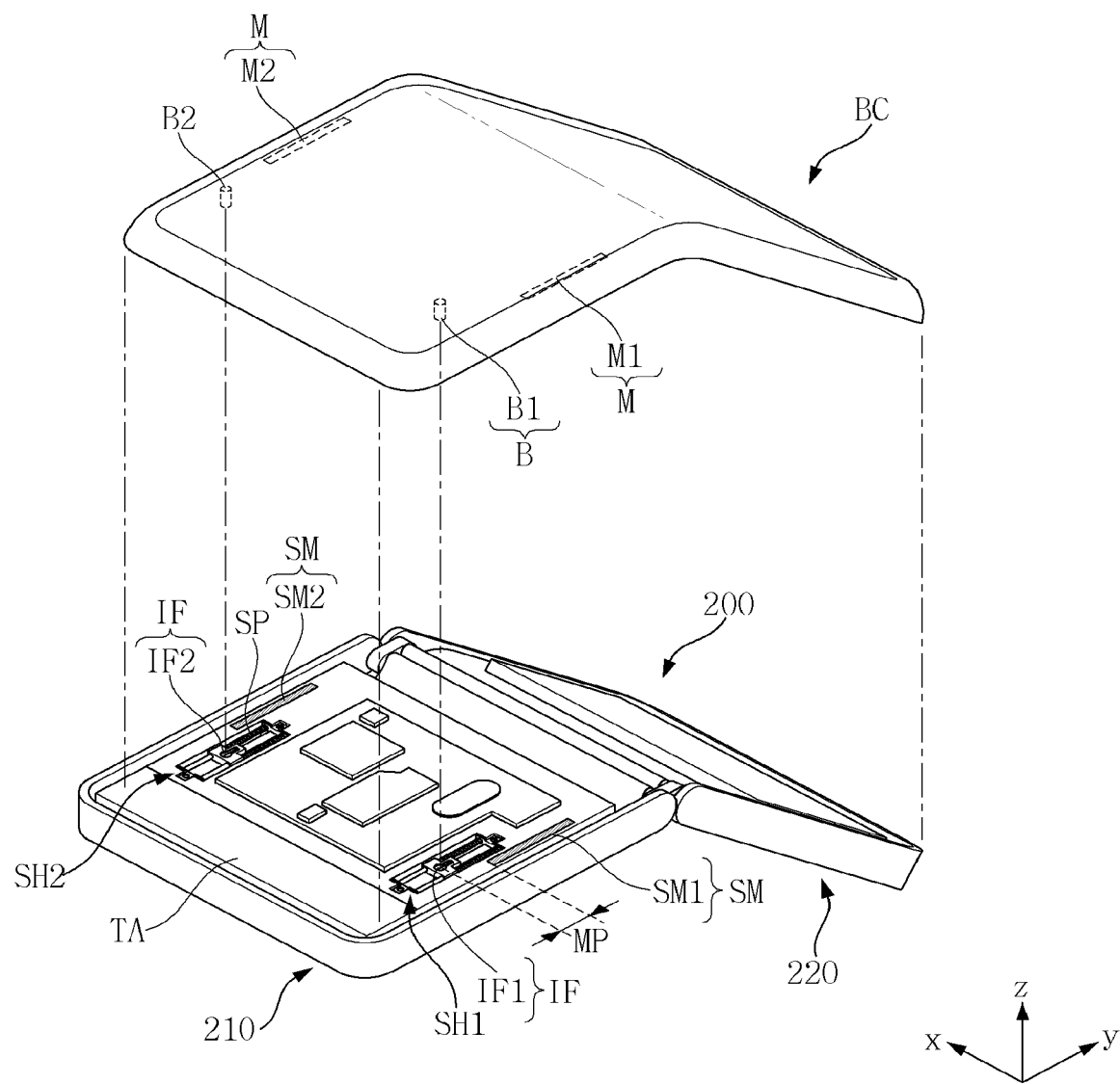
Figure 14:
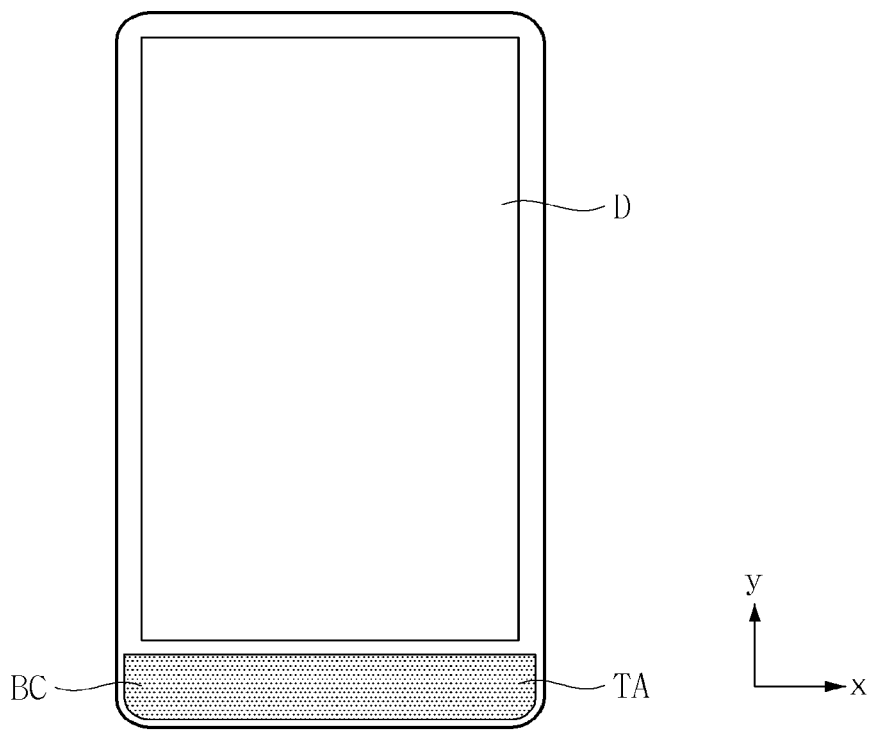
Figure 14:
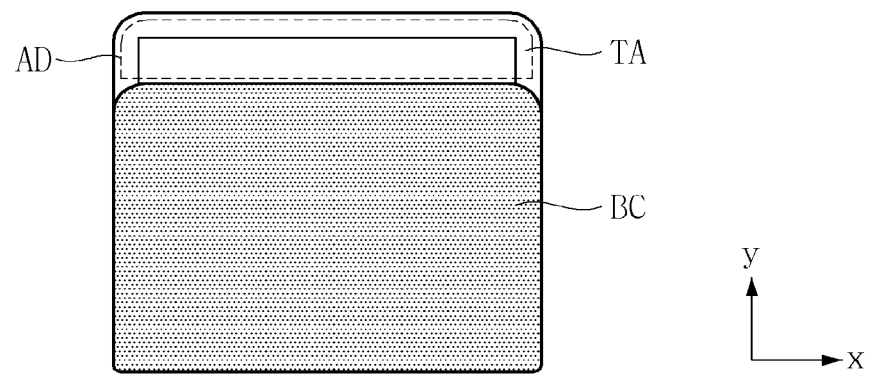
Figure 15:
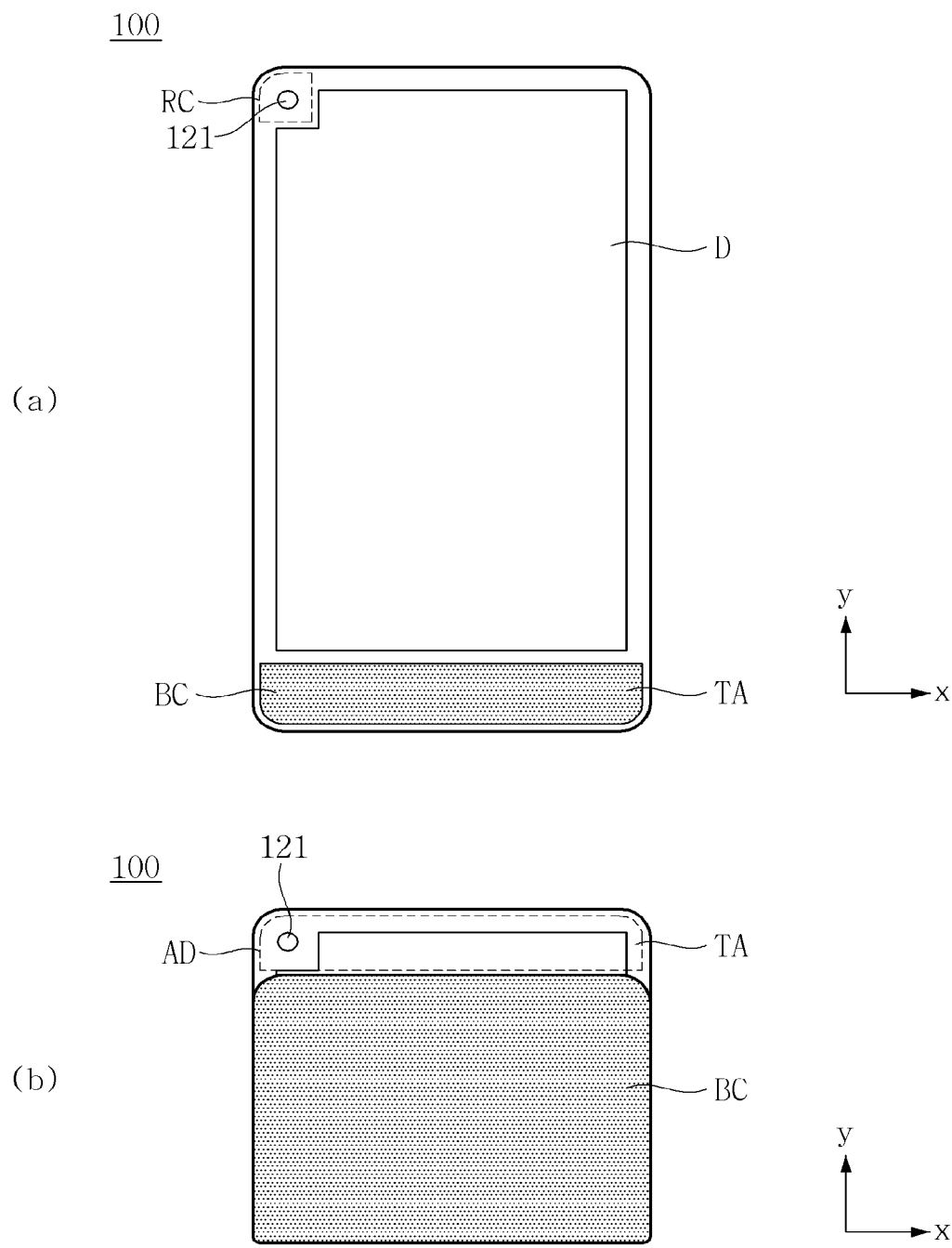

As illustrated in FIG. 13, the first and second bodies 210, 220 may be in a third state. In the third state, the back cover (BC) may be in a state of being moved by a predetermined distance in the y direction. In other words, it denotes that the mobile terminal moves in the y direction from the initial distance (IP) in a state of the movement distance (MP). A size of the initial distance (IP) may be larger than that of the movement distance (MP).

The first and second sliding magnets (SM1, SM2) may maintain contact with the first and second contact regions (M1, M2) even while the back cover (BC) is slidably moved by a predetermined distance. In other words, it denotes that when the magnitude of a magnetic force between the first and second sliding magnets (SM1, SM2) and the first and second contact regions (M1, M2) is appropriately adjusted, the sliding of the back cover (BC) can be achieved. The first and second contact regions (M1, M2) may be metal and/or magnetic materials.

As illustrated in FIG. 14A, the mobile terminal 100 may be in a first state.

As illustrated in FIG. 14B, the mobile terminal 100 may be in a second state that the mobile terminal is folded. In the second state, a part of the back cover (BC) may be slid and the display region (AD) may be uncovered through the transmission region (TA). In other words, a partial region of the entire display (D) may be uncovered to the outside. Accordingly, even when the mobile terminal 100 in the second state is not subjected to additional operations such as unfolding, time information necessary for the user may be transmitted.

As illustrated in FIG. 15A, the mobile terminal 100 according to another embodiment of the present disclosure may include a camera 121. The camera 121 may be located in a recessed region (RC) of the display (D). In other words, it denotes that there may exists a recessed area (RC) in which a partial region of the display (D) with a rectangular shape is cut. This configuration may be useful when it is not easy to secure a space for mounting the camera 121 in the bezel region.

The camera 121 of the recessed region (RC) may capture an outside even when the mobile terminal 100 is in the second state, as illustrated in FIG. 15B. In other words, it denotes that the camera 121 may be uncovered to an outside through the transmission region (TA). In other words, it denotes that the camera 121 and the display region (AD) can be simultaneously uncovered through the transmission region (TA).

Figure 16:
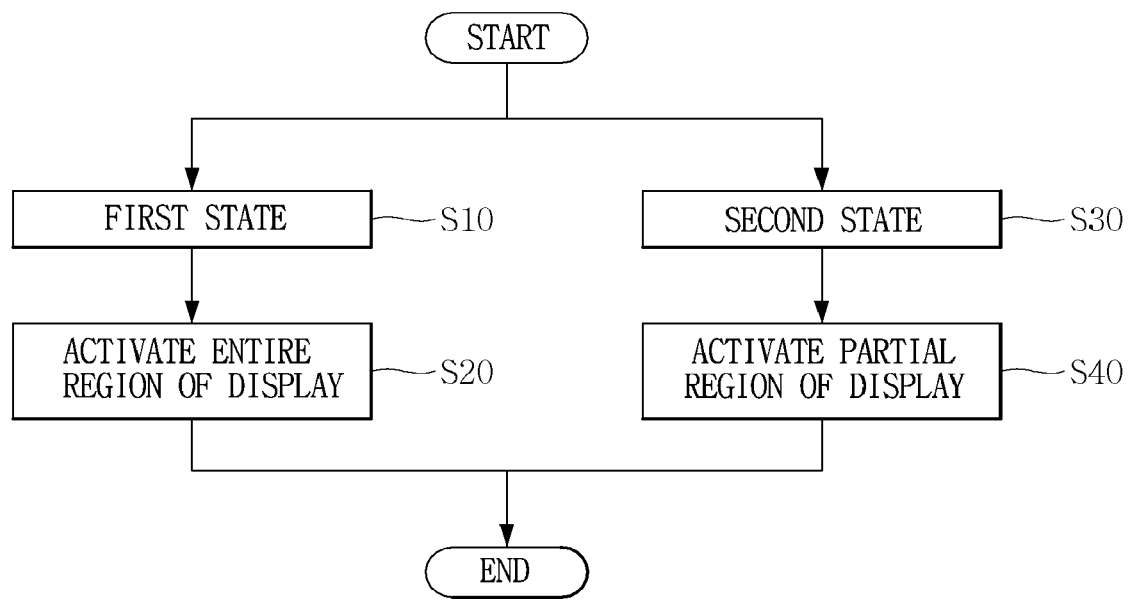
FIGS. 16 through 18 are views illustrating the operation of a mobile terminal according to an embodiment of the present disclosure.
Figure 17:
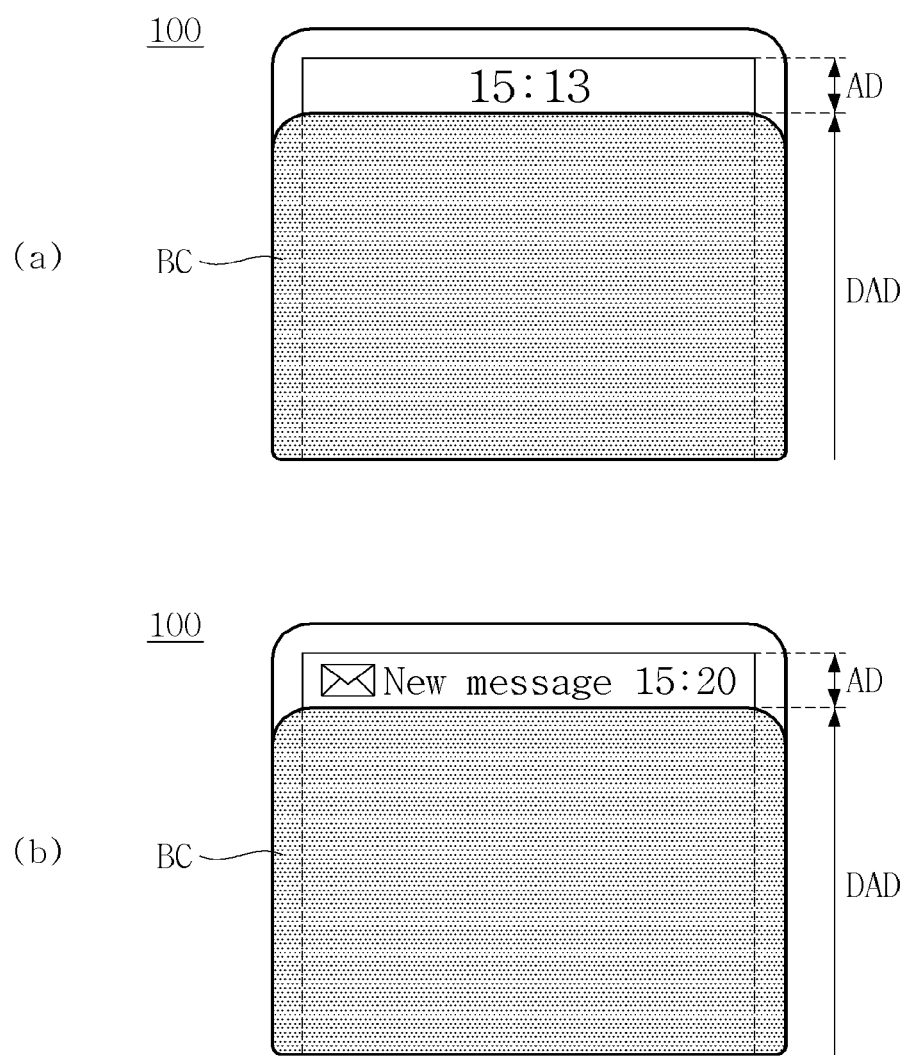
Figure 18:
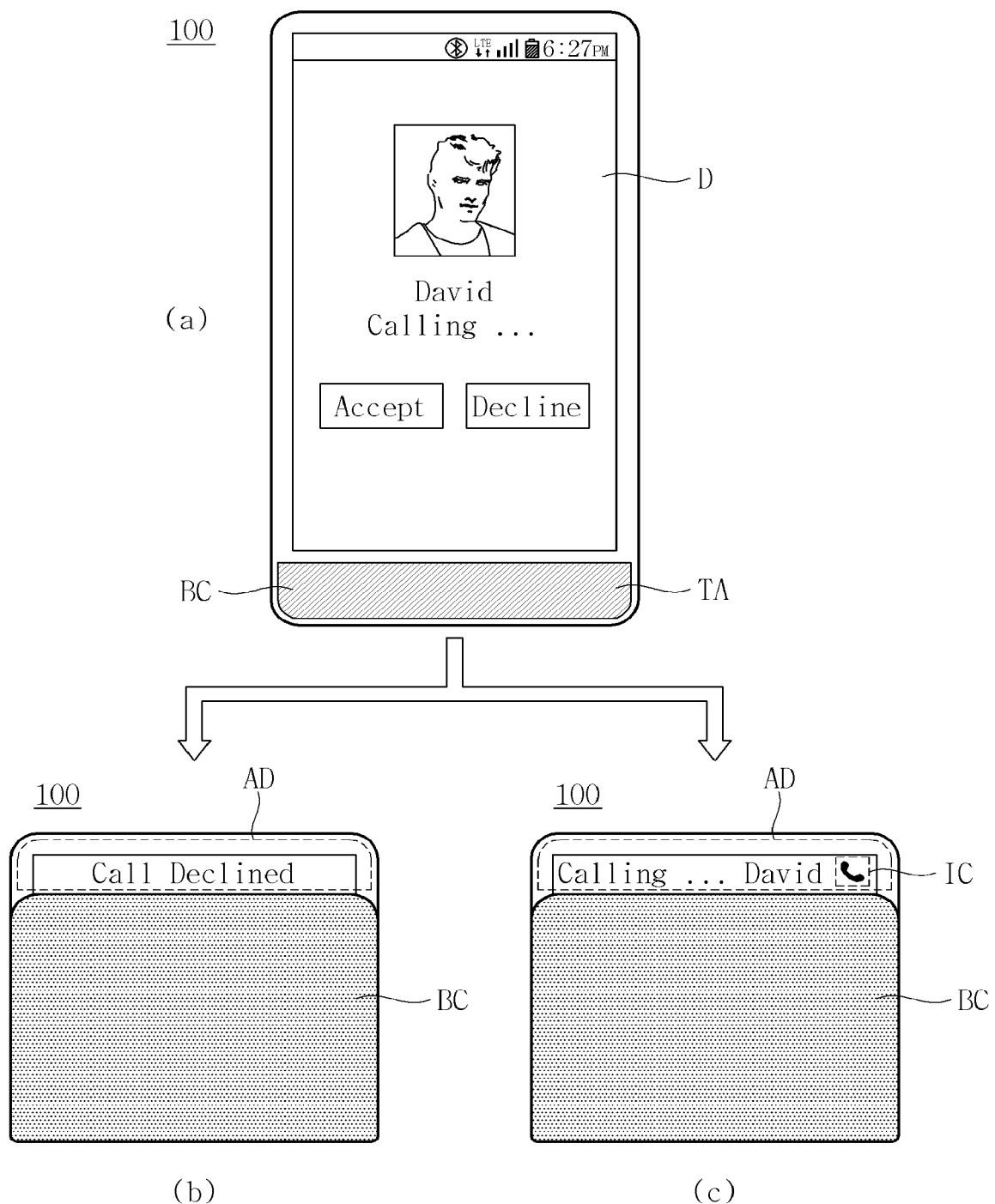

FIGS. 16 through 18 are views illustrating the operation of a mobile terminal according to an embodiment of the present disclosure.

As illustrated in the drawings, the controller 180 of the mobile terminal 100 according to an embodiment of the present disclosure may perform different operations according to the folding state of the mobile terminal 100.

As illustrated in FIG. 16, the controller 180 may determine the state of the mobile terminal 100.

When the mobile terminal 100 is in the first state (S10), the controller 180 may activate an entire region of the display (D) (S20). Otherwise, it denotes that an image can be displayed using the entire region of the display (D).

When the mobile terminal 100 is in the second state (S30), the controller 180 may activate a partial region of the display (D) (S40). Otherwise, it denotes that a partial region of the display (D) can be activated but the other region can be deactivated.

As illustrated in FIG. 17A, in the second state, the controller 180 may display specific information in the display region (AD). For example, time information may be displayed in the display region (AD). The user may check the time information even when the mobile terminal 100 is folded.

The controller 180 may deactivate a covered region DAD that is covered by the back cover (BC). In other words, it denotes that information can be displayed by selectively activating only a minimum region uncovered to the outside. Therefore, it may be possible to minimize current consumption required for the operation of the mobile terminal 100.

As illustrated in FIG. 17B, in the second state, the controller 180 may display event information in the display region (AD). For example, it denotes that whether or not a message has been received, and the content of the received message can be displayed. The event information may be displayed along with other information such as time information.

As illustrated in FIG. 18, the controller 180 may perform a specific operation according to a user's operation for the mobile terminal 100.

As illustrated in FIG. 18A, the mobile terminal 100 may receive a call in a first state. The controller 180 may display the reception state of the call on the display (D).

As illustrated in FIG. 18B, the user may switch the mobile terminal 100 from the first state to the second state while receiving a call. In other words, it denotes that an operation of folding the mobile terminal 100 can be carried out. When the mobile terminal 100 is switched to the second state, the controller 180 may determine that the user refuses to receive a call. Therefore, the controller 180 may display the relevant content in the display region (AD) and stop receiving a call.

As illustrated in FIG. 18C, when the user switches the mobile terminal 100 from the first state to the second state while receiving a call, the controller 180 may switch the screen informing the reception of the call In other words, it denotes that a call reception notification screen displayed in the entire region of the display (D) in the first state can be displayed to correspond to the display region (AD) in the second state.

The controller 180 may display an icon (IC) for guiding a user's touch input to a call receiving state and/or whether or not to receive a call in the display region (AD). A touch sensor may be integrated in the transmission region (TA) to acquire a touch input to the display region (AD). The controller 180 may selectively activate a touch sensor integrated in the transmission region (TA) when the mobile terminal 100 is in the second state.

FIGS. 19 through 22 are views illustrating the configuration and operation of a hinge assembly of a mobile terminal according to an embodiment of the present disclosure.

As shown in the drawings, the hinge assembly (HGA) of the mobile terminal 100 according to an embodiment of the present disclosure may guide a positional change of the display (D) according to a state change of the mobile terminal 100. The hinge assembly (HGA) of the mobile terminal 100 according to an embodiment of the present disclosure may provide space for accommodating the positional changed display (D).

Figure 19:
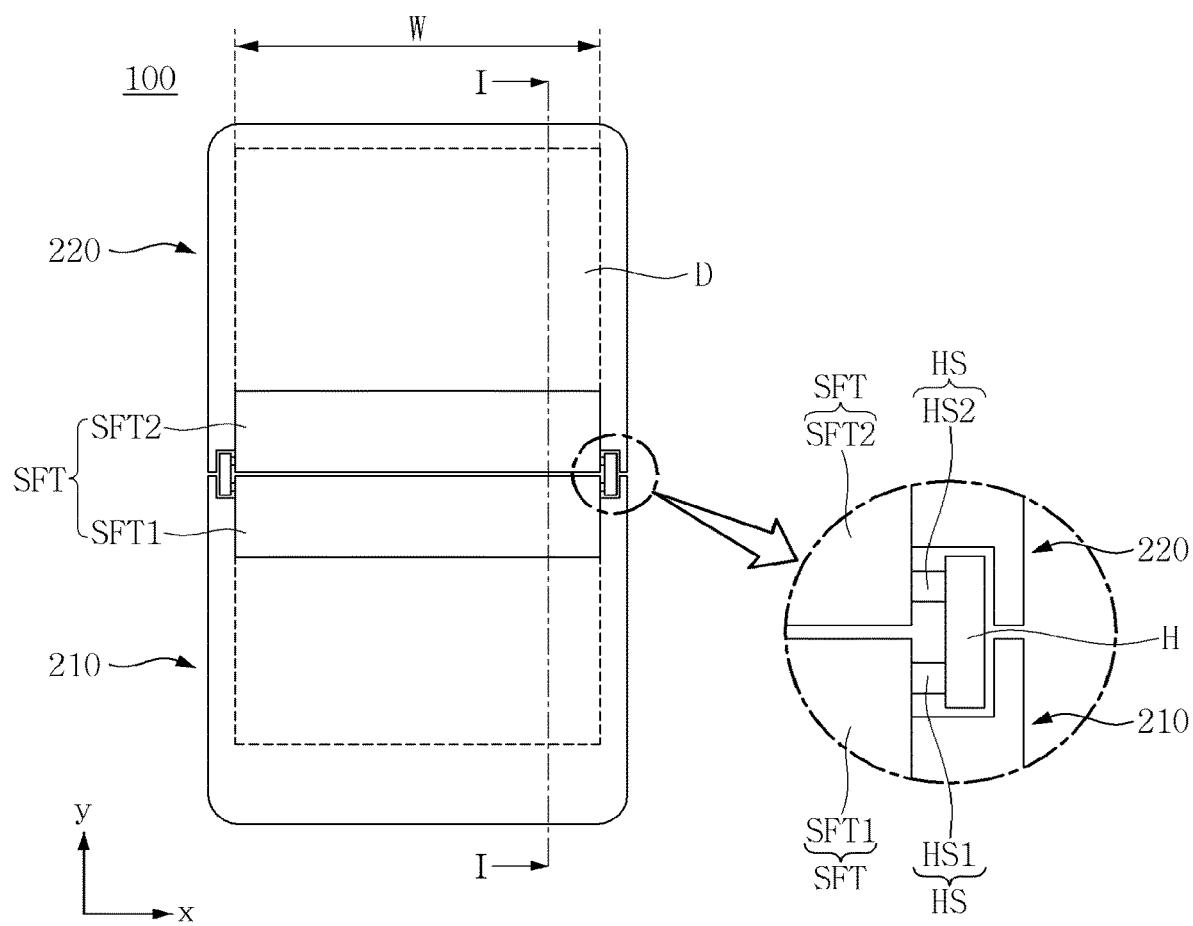
FIGS. 19 through 22 are views illustrating the configuration and operation of a hinge assembly of a mobile terminal according to an embodiment of the present disclosure.

As illustrated in FIG. 19, the hinge assembly (HGA) may connect the first and second bodies 210, 220 of the mobile terminal 100. The first and second bodies 210, 220 are rotatable about a hinge assembly (HGA).

The hinge assembly (HGA) may include a guide shaft (SFT) and a head (H). The head (H) and the guide shaft (SFT) may be connected by a hinge shaft (HS). One side of the guide shaft (SFT) may be connected to the hinge shaft (HS) and the other side thereof may be connected to the body 200. In other words, the first guide shaft (SFT1) may be connected to the first head (H1) and the first body 210, and the second guide shaft (SFT2) may be connected to the second head (H2) and the second body 220.

A length of the guide shaft (SFT) may be substantially equal to or larger than a width (W) of the display (D). In other words, it denotes that the guide shaft (SFT) can guide an entire region of the display (D) corresponding thereto.

Figure 20:
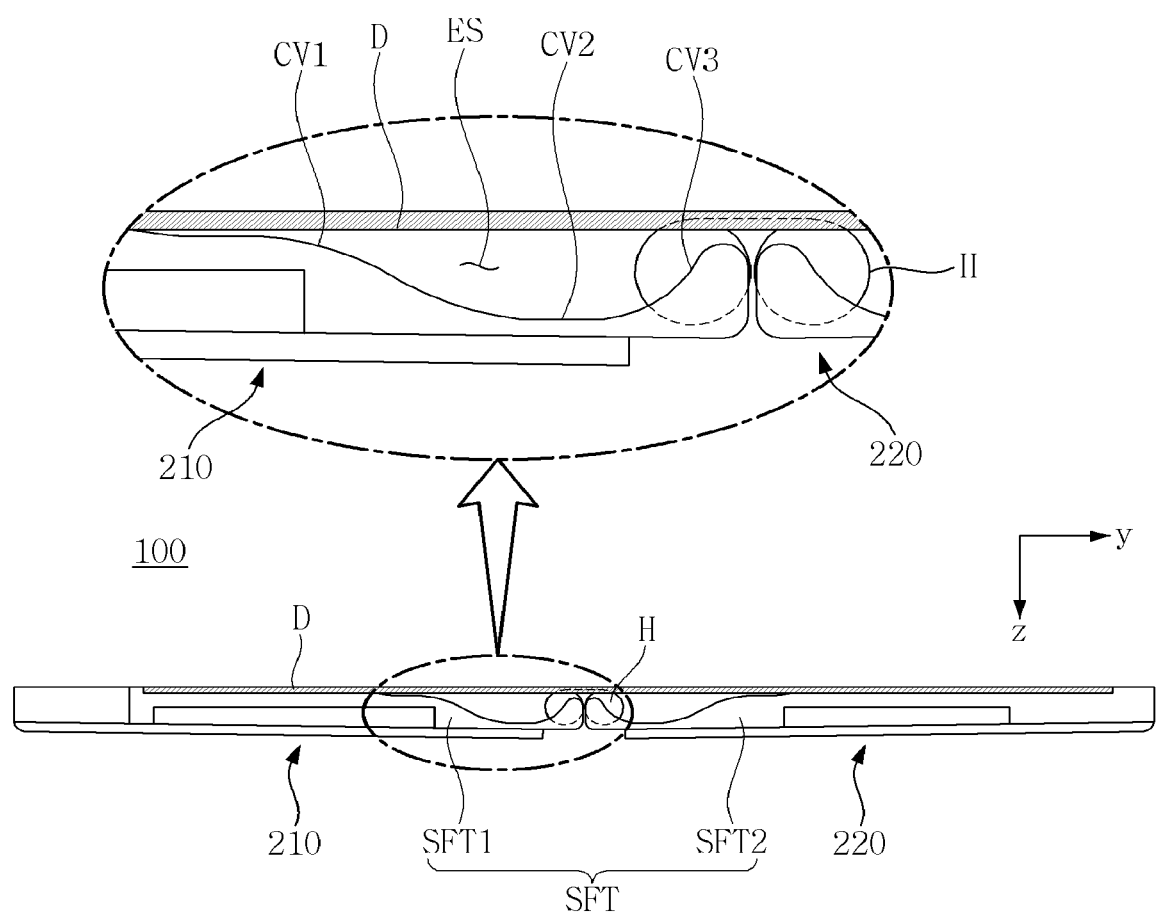
Figure 21:
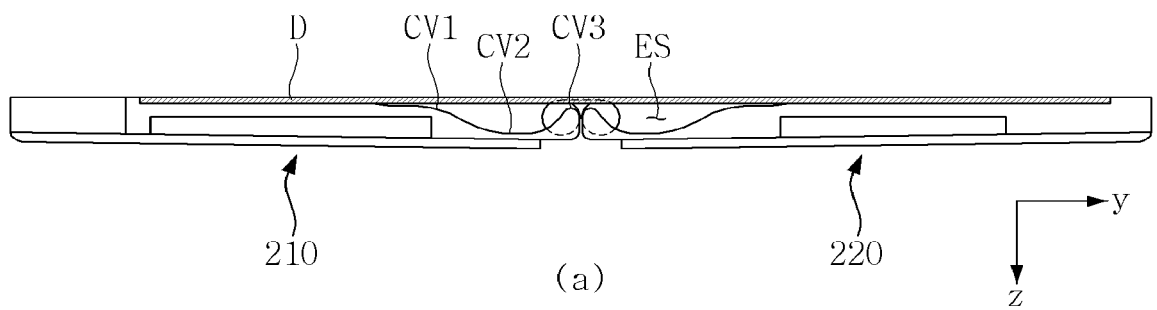
Figure 21:
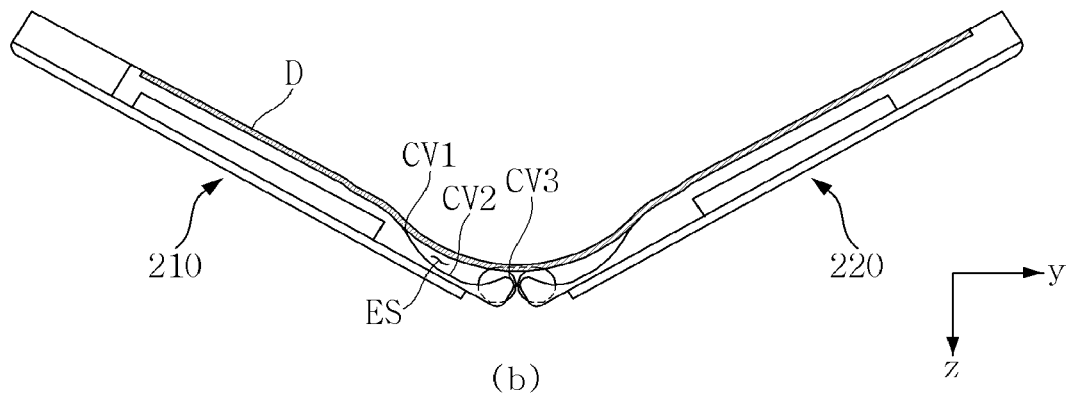

As illustrated in FIG. 20, a plurality of guide shafts (SFTs) may be arranged symmetrically with respect to each other. The plurality of guide shafts (SFTs) may maintain a mutually symmetrical shape irrespective of a state change of the mobile terminal 100.

The guide shaft (SFT) may form the escape region (ES). In other words, it denotes that there exists a region in which a partial region of the display (D) can be moved according to a state change.

The escape region (ES) may be provided by the shape of the guide shaft (SFT). For example, it denotes that the escape region (ES) can be formed by a plurality of curved portions (CV1, CV2, CV3). The first curved portion (CV1) may be positioned at the furthest point around a point where the guide shaft (SFT) is connected to the head (H), and the second and third curved portions (CV2, CV3) may be sequentially positioned in proximity to the head (H). In other words, it may be said that at least a part of the plurality of curved portions (CV1, CV2, CV3) overlaps with at least a partial region of the head (H) in the width direction of the mobile terminal 100. In other words, it may be said that the plurality of curved portions (CV1, CV2, CV3) are formed in a region where the first and second bodies 210, 220 are adjacent to each other. In other words, it may be said that the plurality of curved portions (CV1, CV2, CV3) are positioned in proximity to a region where the folding of the mobile terminal 100 occurs.

The curved portions (CV1, CV2, CV3) may have different curvatures. For example, a curvature of the first curved portion (CV1) may be larger than that of the third curved portion (CV3). A curvature of the second curved portion (CV2) may be larger than that of the first and third curved portions (CV1, CV3).

As illustrated in FIG. 21A, in the first state, the display (D) may be positioned flat on an upper surface of the first and second bodies 210, 220.

As illustrated in FIG. 21B, when the first and second bodies 210, 220 start folding, a bending region (BA) of the display (D) starts to move to the escape region (ES). The first curved portion (CV1) may guide the movement of the display (D) to the escape region (ES). In other words, it denotes that the bending region (BA) of the display (D) is brought into contact with a curved surface of the first curved portion (CV1) to naturally perform the bending of the display (D).

Depending on a degree of folding of the first and second bodies 210, 220, the bending region (BA) may be sequentially brought into contact with the second and third curved portions (CV2, CV3). The display (D) may be naturally positioned within the escape region (ES) while being brought into contact with the second and third curved portions (CV2, CV3).

Figure 22:
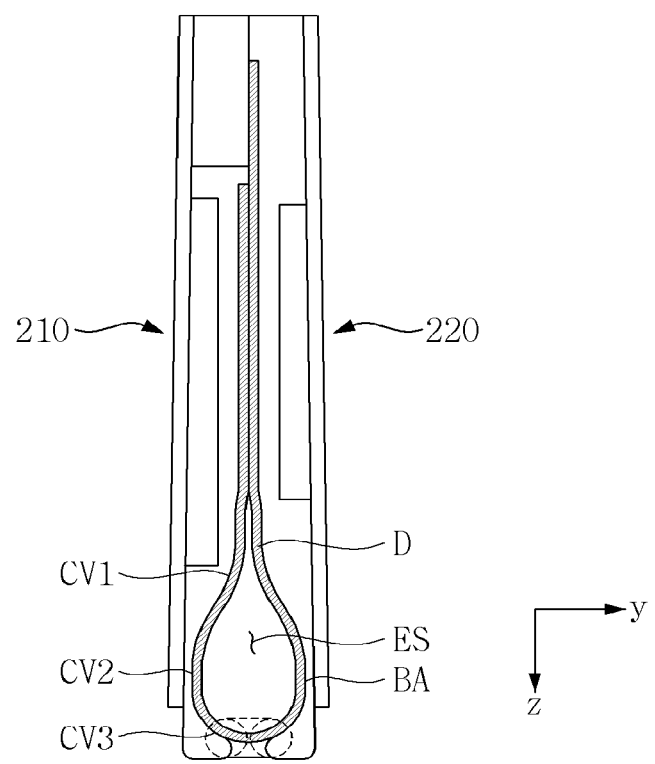

As illustrated in FIG. 22, the bending region (BA) of the display (D) in the second state may be brought into contact with at least one of the first to third curved portions (CV1, CV2, CV3). The bending region (BA) brought into contact with the first to third curved portions (CV1, CV2, CV3) may be stably positioned in the escape region (ES).

Figure 23:
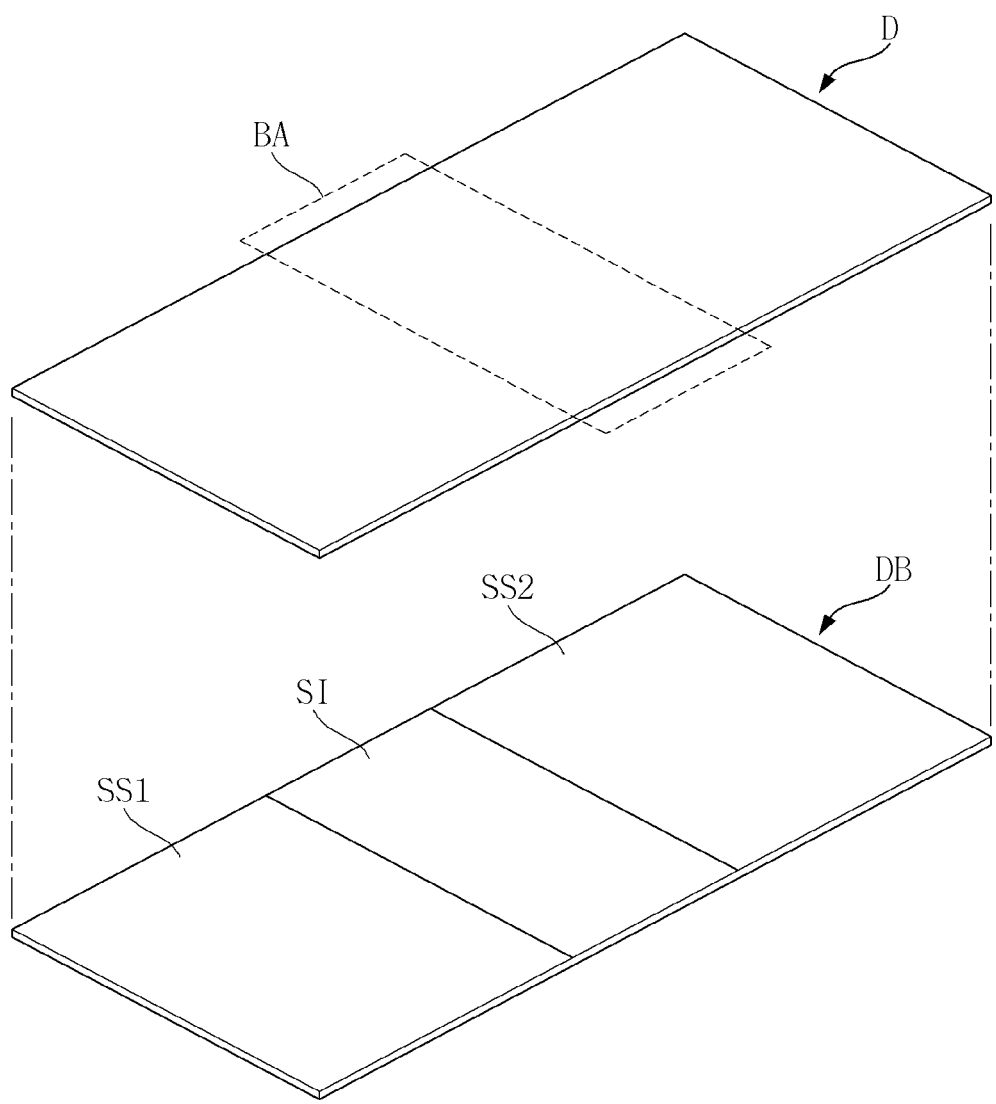
FIG. 23 is a view for explaining the configuration of a plate of a mobile terminal according to an embodiment of the present disclosure.

FIG. 23 is a view for explaining the configuration of a plate of a mobile terminal according to an embodiment of the present disclosure.

As illustrated in the drawing, the plate (DB) of the mobile terminal 100 according to an embodiment of the present disclosure may support the display (D).

A plate (DB) may be positioned between the display (D) and the body 200. The plate (DB) may support the display (D). For example, it denotes that the display (D) that is flexible in the first state can be maintained flat.

The plate (DB) may configured with a plurality of regions. For example, the plate (DB) may include rigid regions (SS1, SS2) and a flexible region (SI). The flexible region (SI) may correspond to the bending region (BA) of the display (D).

The rigid regions (SS1, SS2) may be made of a hard material. For example, it denotes that the rigid regions (SS1, SS2) may be a SUS and/or a plastic material. The flexible region (SI) may be made of a soft material. For example, it denotes that the flexible region (SI) may be a silicon material. Therefore, it may be possible to effectively support and bend the display (D).

Figure 24:
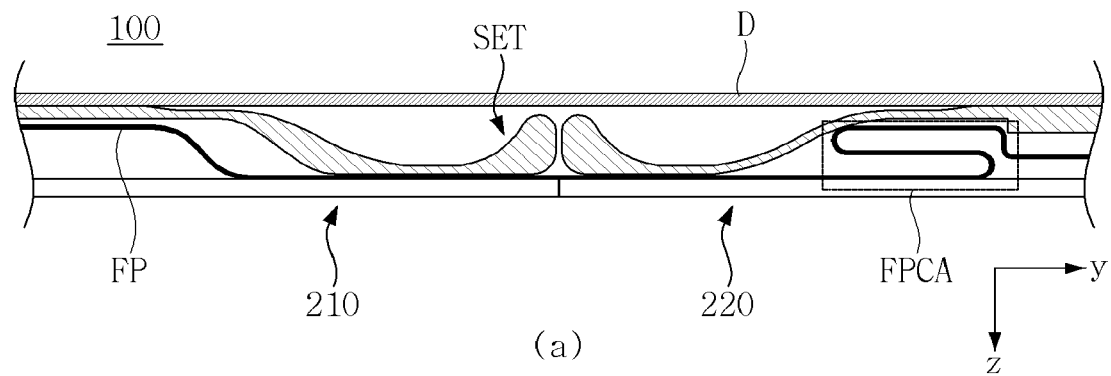
FIG. 24 is a view for explaining the operation of a flexible cable according to an embodiment of the present disclosure.
Figure 24:
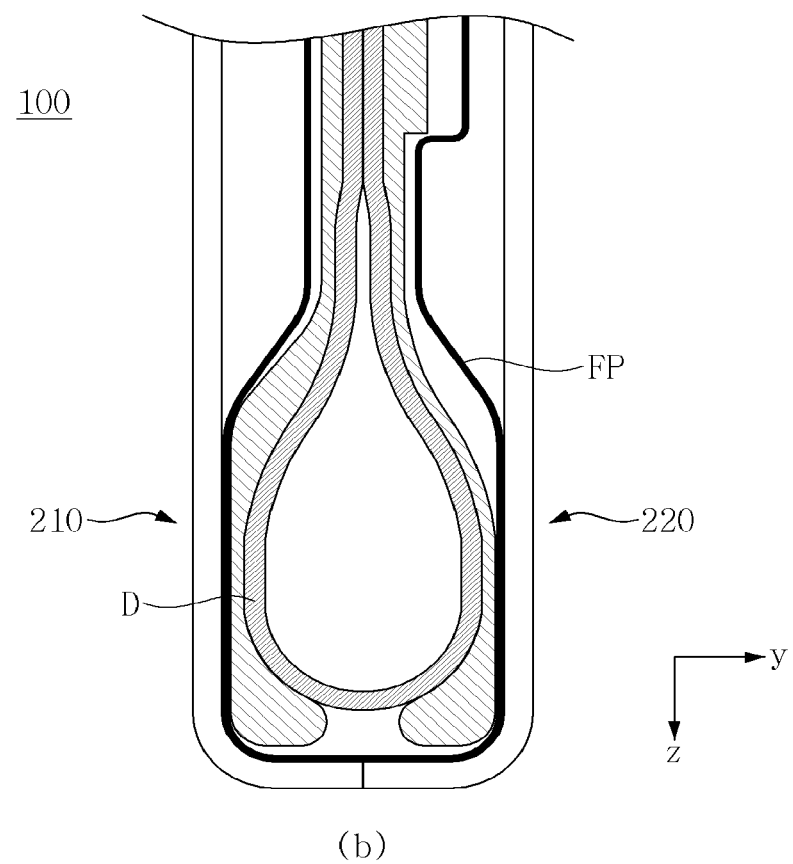

FIG. 24 is a view for explaining the operation of a flexible cable according to an embodiment of the present disclosure.

As illustrated in the drawing, the mobile terminal 100 according to an embodiment of the present disclosure may include a flexible cable (FP) capable of coping with a length change due to folding of the first and second bodies 210, 220.

As illustrated in FIG. 24A, the flexible cable (FP) may be positioned over the first and second bodies 210, 220. In other words, it denotes that a signal between an electronic component integrated in the first body 210 and an electronic component integrated in the second body 220 can be transmitted through the flexible cable (FP). A coil region (FPCA) may be formed on the flexible cable (FP).

The coil region (FPCA) may be formed on a path of the flexible cable (FP). The coil region (FPCA) may be a region in which the flexible cable (FP) is overlapped. The coil region (FPCA) may be positioned in the second body 220 to which the back cover (BC) is fixed.

The coil region (FPCA) may buffer variations in length due to folding and unfolding of the first and second bodies 210, 220. For example, a length of the flexible cable (FP) overlapped in the coil region (FPCA) when the mobile terminal 100 is in the first state may be the largest.

As illustrated in FIG. 24B, when in a second state in which the mobile terminal 100 is completely folded, a length of the flexible cable (FP) overlapped in the coil region (FPCA) is the smallest or the coil region (FPCA) may disappear temporarily. In other words, it denotes that a change in length due to folding of the first and second bodies 210, 220 can be compensated while the coil region (FPCA) is released.

FIGS. 25 through 29 are views illustrating the configuration and operation of a magnet assembly integrated into a mobile terminal according to an embodiment of the present disclosure.

As illustrated in the drawings, the mobile terminal 100 according to an embodiment of the present disclosure may include a plurality of magnet assemblies (SM, HM). The plurality of magnets (SM, HM) may stably fix the mobile terminal 100 to a specific position.

Figure 25:
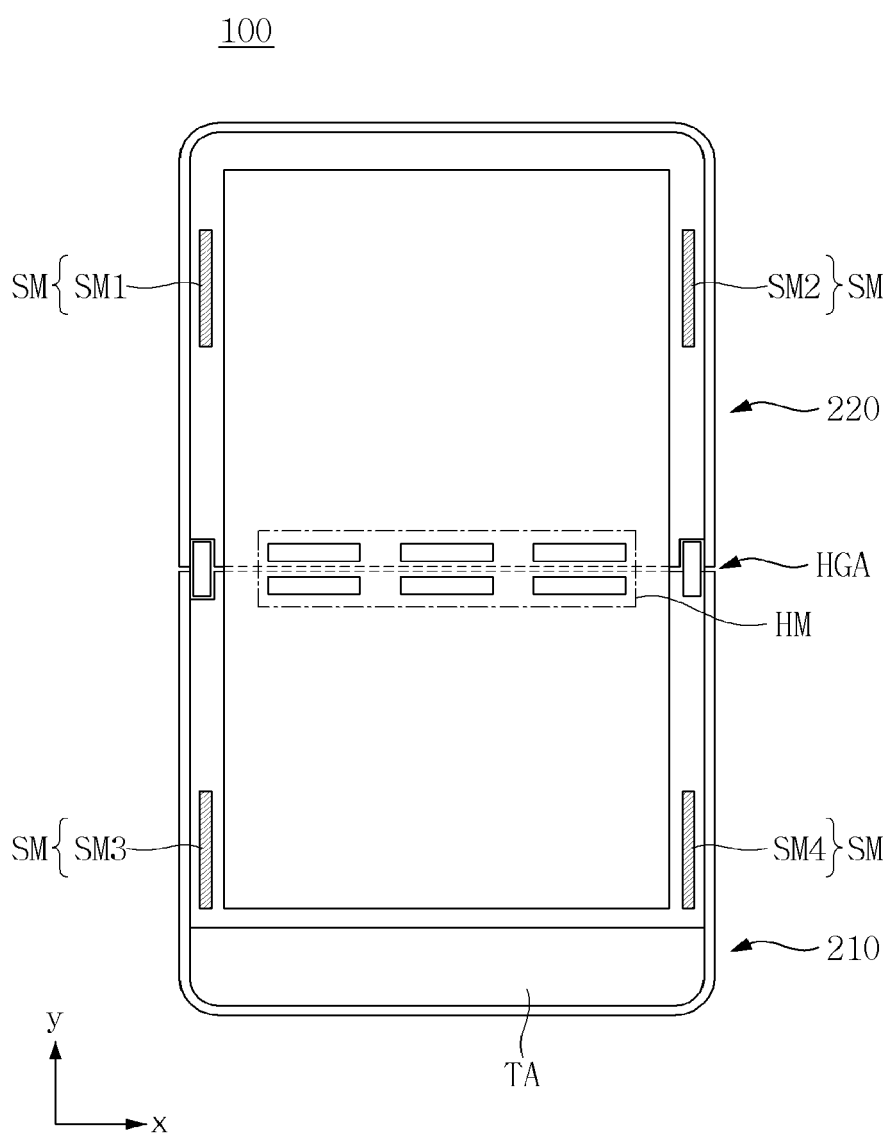
FIGS. 25 through 29 are views illustrating the configuration and operation of a magnet assembly integrated into a mobile terminal according to an embodiment of the present disclosure.

As illustrated in FIG. 25, the first and second magnet assemblies (SM, HM) may be positioned in the mobile terminal 100. The first magnet assembly (SM) may be positioned on a bezel on a side of the display (D). The second magnet assembly (HM) may be positioned in an edge region of the first and second bodies 210, 220. Although the magnet assemblies (SM, HM) are illustrated in the respective portions of the mobile terminal 100 for the sake of convenience of understanding, the magnet assemblies (SM, HM) may be integrated in the mobile terminal 100. Therefore, it may not be possible to visually observe the magnet assemblies (SM, HM) from the outside.

The first magnet assembly (SM) may include the 1a-th through 1d-th magnet assemblies (SM1 through SM4). The 1a-th magnet assembly (SM1) and the 1c-th magnet assembly (SM3) may be positioned to correspond to each other. The 1b-th magnet assembly (SM2) and the 1d-th magnet assembly (SM4) may be positioned to correspond to each other. In other words, it denotes that when the mobile terminal 100 is folded, they may be arranged close to each other.

The second magnet assembly (HM) may include the 2a-th through 2d-th magnet assemblies (HM1 through HM4). The 2a-th through 2d-th magnet assemblies (HM1 through HM4) may be disposed in an edge region where the first and second bodies 210, 220 are in contact with each other. Therefore, when the mobile terminal 100 is in a first state, the corresponding second magnet assemblies (HMs) may be brought close to each other. When the second magnet assemblies (HMs) are brought close to each other, the first and second bodies 210, 220 may be in contact with each other. Therefore, even when a slight external force is applied, the unfolded state of the first and second bodies 210, 220 may be maintained.

Figure 26:
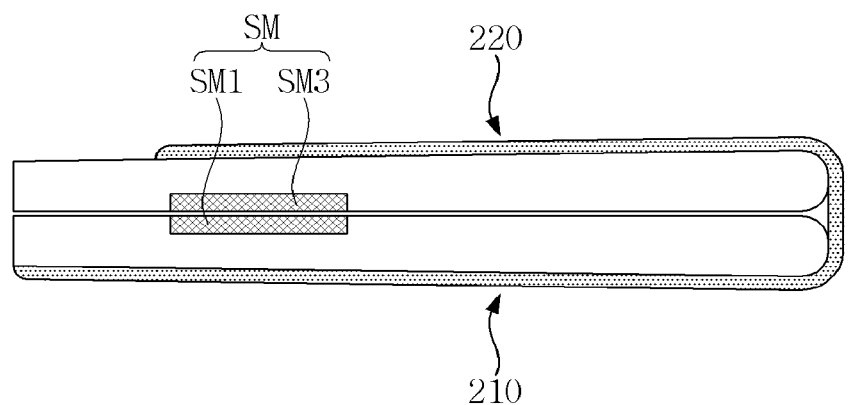

As illustrated in FIG. 26, in case of the second state, the first magnet assemblies (SMs) may be brought close to each other. For example, the 1c-th magnet assembly (SM3) of the first body 210 and the 1a-th magnet assembly (SM1) of the second body 220 may be brought close to each other. The 1c-th magnet assembly (SM3) and the 1a-th magnet assembly (SM1) may exert an attractive force on each other. Therefore, the first and second bodies 210, 220 may not be spaced from each other before an external force exceeding the magnetic force of the first magnet assembly (SM) is applied. In other words, it denotes that the second state can be stably maintained.

Figure 27:
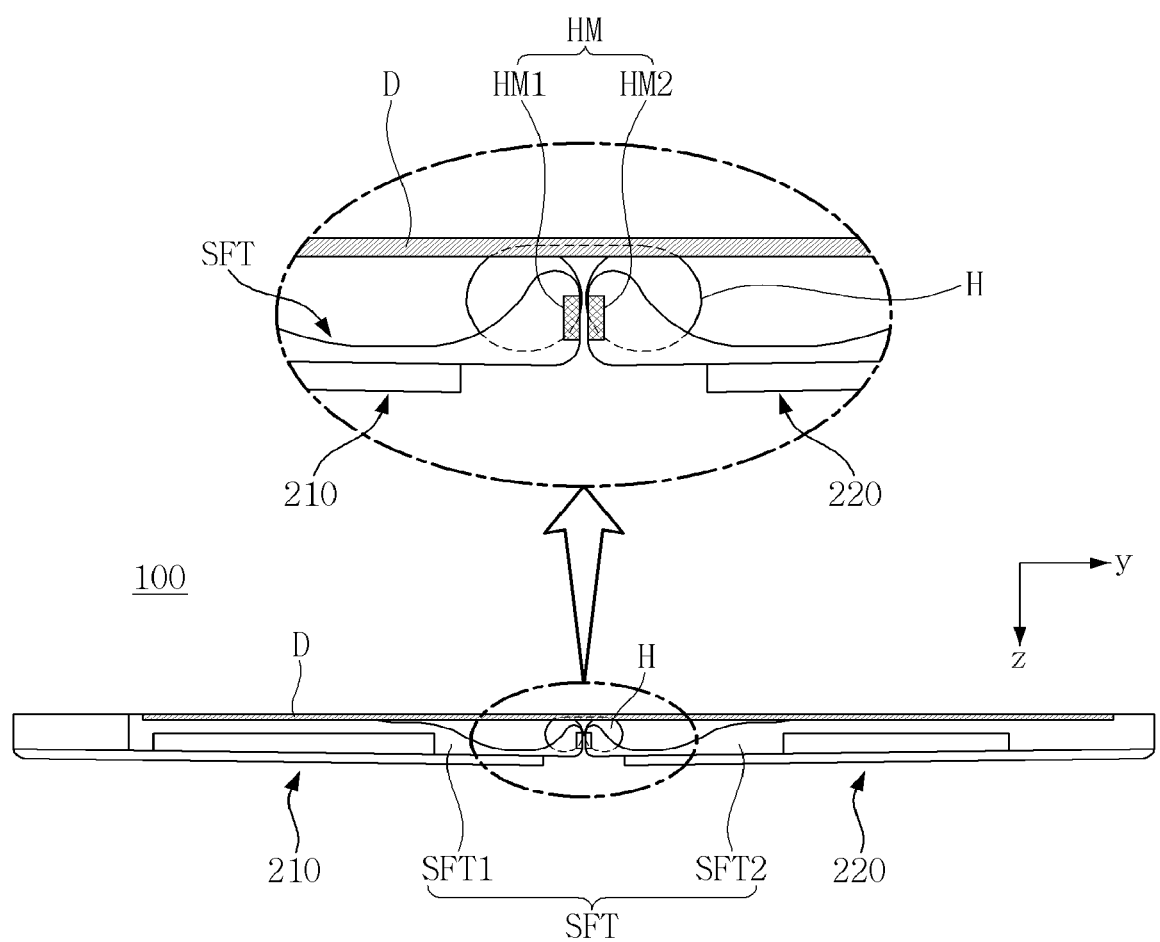

As illustrated in FIG. 27, in case of the first state, the second magnet assemblies (HMs) may be brought close to each other. For example, it denotes that when the second magnet assembly (HM1) disposed on a side surface of the first body 210 and the second magnet assembly (HM2) disposed on a side surface of the second body 220 are in the first state, they can be brought close to each other. The 2a-th magnet assembly (HM1) and the 2b-th magnet assembly (HM2) may exert an attractive force on each other. Therefore, the first and second bodies 210, 220 may maintain the first state before an external force exceeding the magnetic force of the second magnet assembly (HM) is applied. Therefore, a user's touch operation with respect to the display (D) may be more stably carried out.

Figure 28:
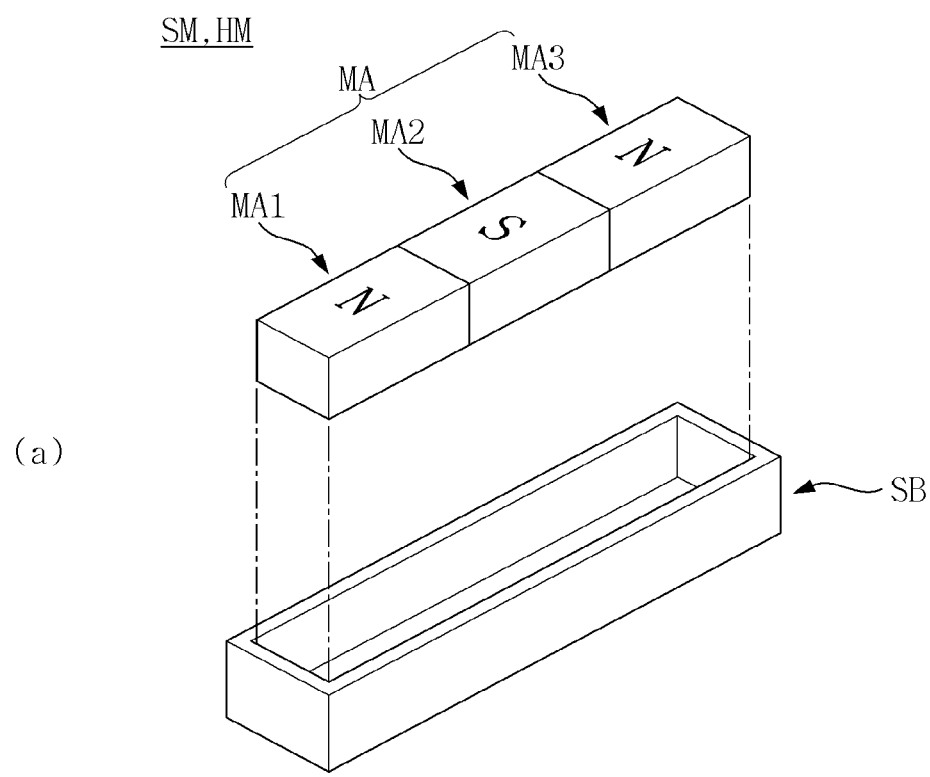
Figure 28:
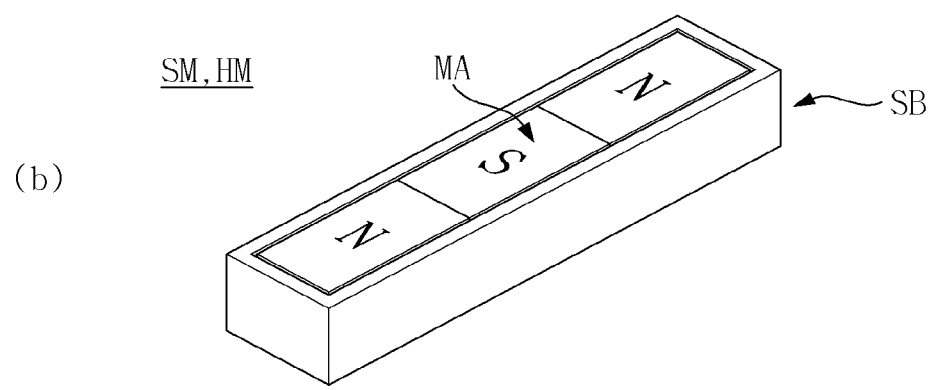

As illustrated in FIG. 28, the magnet assemblies (SM, HM) according to an embodiment of the present disclosure may be a combination of a plurality of magnets (MAs). The magnets (MAs) may include first, second, and third magnets (MA1, MA2, MA3).

The first, second and third magnets (MA1, MA2, MA3) may be arranged with different polarities. For example, it denotes that the S-pole of the first and third magnets (MA1, MA3) faces upward and the N-pole of the second magnet (MA2) faces upward. The first, second and third magnets (MA1, MA2, MA3) may be an odd-number. Due to an arrangement of different poles and/or an odd number of magnets (MAs), a magnetic force may be maximized with a relatively small magnetism.

A magnet bracket (SB) may accommodate the magnet (MA). The magnetic bracket (SB) can block an magnetic force directed to the side surface and the lower surface. In other words, it denotes that the side surface and the lower surface can be shielded. Therefore, a magnetic force of the magnet (MA) may be emitted only toward the upper surface, which is an opening of the magnet bracket (SB). Accordingly, the effect of the magnet (MA) on other electronic components inside the mobile terminal 100 may be minimized. The magnetic bracket (SB) may be made of a metal material.

Figure 29:
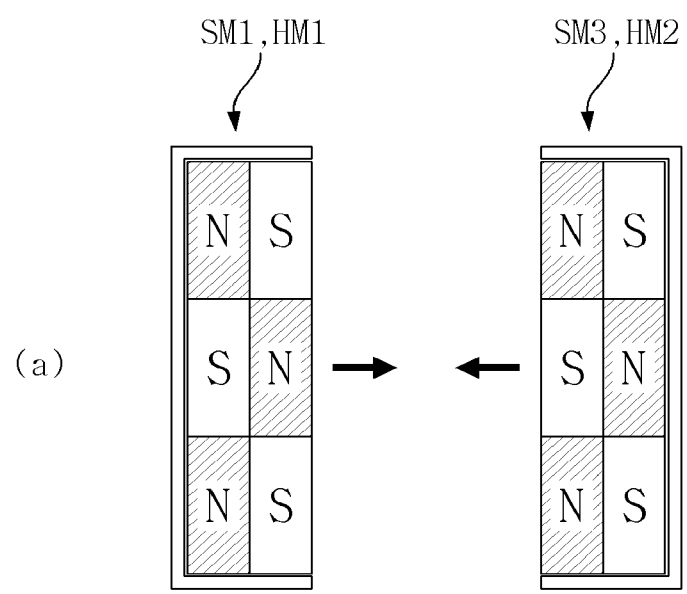
Figure 29:
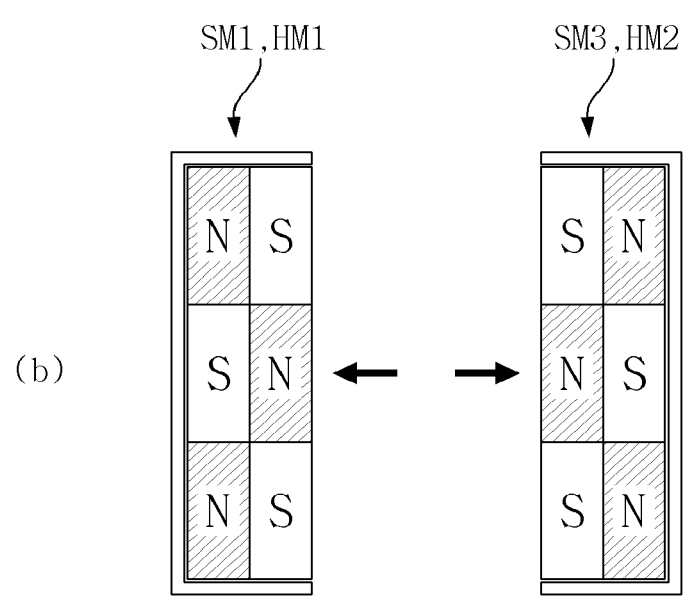

As illustrated in FIG. 29, the corresponding magnet assemblies (SM, HM) may be arranged in various structures in order to optimize the magnetic force.

As illustrated in FIG. 29A, the corresponding magnet assemblies (SM, HM) may be arranged to exert an attractive force on each other. For example, it denotes that the N-pole can be arranged to correspond to the S-pole.

As illustrated in FIG. 29B, the corresponding magnet assemblies (SM, HM) may be arranged to exert a repulsive force on each other. For example, it denotes that the S-pole can be arranged to correspond to the S-pole.

The magnet assemblies (SM, HM) exerting a repulsive force act may be used along with the magnet assemblies (SM, HM) exerting an attractive force. For example, when three second magnet assemblies (HMs) are arranged in an edge region of the body 200, it denotes that two are arranged to exert an attractive force and one is arranged to exert a repulsive force. With this arrangement, the magnetic force may be controlled more finely, unlike the case of exerting only an attractive or exerting only a repulsive force.

Figure 30:
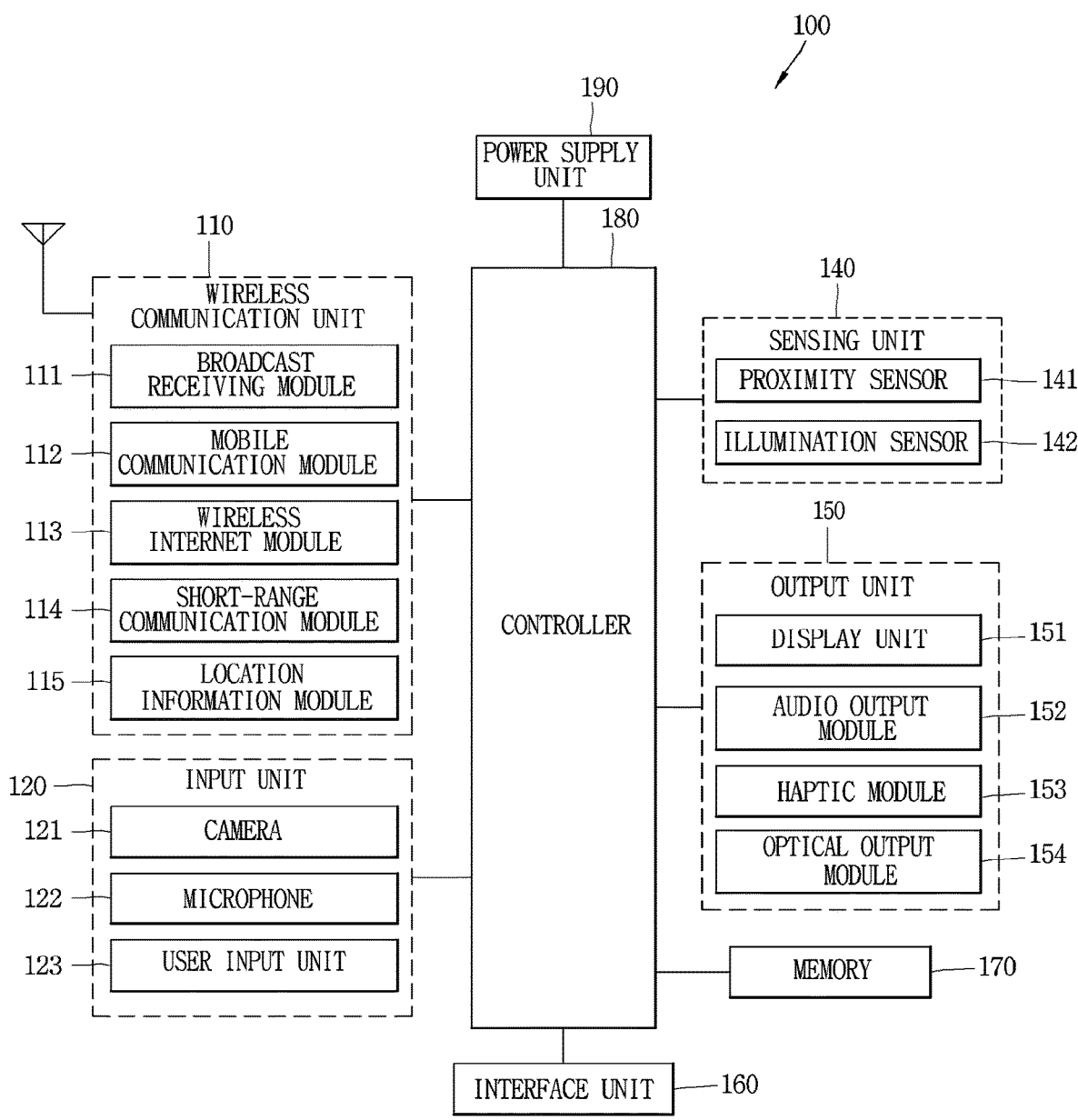
FIG. 30 is a block diagram for explaining a mobile terminal associated with the present disclosure.

FIG. 30 is a block diagram for explaining a mobile terminal associated with the present disclosure.

The mobile terminal 100 may include components, such as a wireless communication unit 110, an input unit 120, a sensing unit 140, an output unit 150, an interface unit 160, a memory 170, a controller 180, a power supply unit 190 and the like. It is understood that implementing all of the illustrated components is not a requirement, and that greater or fewer components may alternatively be implemented. Referring now to FIG. 28, the mobile terminal 100 is shown having wireless communication unit 110 configured with several commonly implemented components.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and an external server. In addition, the wireless communication unit 110 may include one or more modules for connecting the mobile terminal 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The mobile terminal 100 may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display unit 151, an audio output module 152, a haptic module 153, an optical output unit 154 and the like. The display unit 151 may have an inter-layered structure or an integrated structure with a touch sensor in order to facilitate a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

In addition, the memory 170 stores data that support various functions of the mobile terminal 100. The memory 170 is typically implemented to store data to support various functions or features of the mobile terminal 100. For instance, the memory 170 may be configured to store application programs executed in the mobile terminal 100, data or instructions for operations of the mobile terminal 100, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 28, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Furthermore, the operation and control or the control method of the mobile terminal may be implemented in the mobile terminal in such a manner of activating at least one application program stored in the memory 170.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. A mobile terminal, comprising:
   a body comprising a plurality of bodies, positioned in a specific state between a first state in which the plurality of bodies is flat and a second state in which the plurality of bodies is folded;
   a flexible display positioned on one side of the body; and
   a hinge assembly having a guide shaft coupled to the plurality of bodies,
   wherein the guide shaft comprises a plurality of curved portions in which at least one curvature is different from at least another curvature,
   wherein the plurality of curved portions comprises first, second, and third curved portions,
   the first curved portion is positioned farther from a center region of the mobile terminal than the second and third curved portions, and
   wherein in the first state,
   a rear side of the flexible display and the plurality of curved portions are separated from each other, and
   a distance between the second curved portion and the rear side of the flexible display is larger than a distance between the first curved portion or the third curved portion and the rear side of the flexible display.

2. The mobile terminal of claim 1, wherein the hinge assembly comprises at least one head positioned between the plurality of bodies, and
   at least a partial region of the curved portion is formed at a position overlapping with at least a partial region of the head in a width direction of the mobile terminal.

3. The mobile terminal of claim 1, wherein
   when changed from the first state to the second state, the flexible display is brought into contact with the first curved portion and then brought into contact with the second and third curved portions.

4. The mobile terminal of claim 1, wherein the plurality of curved portions forms an escape region in which the guide shaft is recessed in a thickness direction of the mobile terminal, and
   wherein at least part of the flexible display is changed from the first state to the second state, and the position thereof is moved to the escape region.

5. The mobile terminal of claim 1, further comprising a back cover,
   wherein the back cover is configured to:
   cover on the other side of the body in the first state, and
   cover at least one of the plurality of bodies of the body in the second state.

6. The mobile terminal of claim 5, wherein one of the plurality of bodies further comprises at least one slider coupled to at least one region of the back cover to allow the back cover to move along a rear surface of the plurality of bodies according to a state change of the plurality of bodies.

7. The mobile terminal of claim 5, wherein one of the plurality of bodies further comprises at least one sliding magnet magnetically attached to a contact region positioned in at least another region of the back cover.

8. The mobile terminal of claim 1, further comprising:
   a bezel in an around region of the flexible display on the body,
   wherein the bezel comprises:
   a first bezel on one side of the flexible display; and
   a second bezel at a position opposite to the first bezel about the flexible display, and
   wherein a width of the second bezel is larger than that of the first bezel.

9. The mobile terminal of claim 8, wherein in the second state, at least a portion of the second bezel is uncovered.

10. The mobile terminal of claim 9, wherein when the position of the body is changed from the first state to the second state, at least a partial region of the body that has been covered by the back cover is uncovered and a partial region of the flexible display is observed through the second bezel.

11. The mobile terminal of claim 8, wherein at least a partial region of the second bezel is a transparent or translucent region.

12. The mobile terminal of claim 1, further comprising:
    a plate positioned between the flexible display and the body to support the flexible display in the first state,
    wherein the plate comprises:
    a plurality of rigid regions configured to support the flexible display; and
    a flexible region between the plurality of rigid regions.

13. The mobile terminal of claim 1, further comprising:
    a first magnet assembly disposed on an opposite side of each of the plurality of bodies to be close to each other in the first state.

14. The mobile terminal of claim 13, wherein the first magnet assembly is disposed in mutually opposed edge regions of the plurality of bodies.

15. The mobile terminal of claim 1, further comprising:
    a second magnet assembly disposed in an outer circumferential region of the flexible display to be close to each other in the second state.

16. The mobile terminal of claim 15, wherein at least one of the first and second magnet assemblies is disposed to generate a repulsive force.

17. The mobile terminal of claim 15, wherein the first and second magnet assemblies comprise:
    a plurality of magnets arranged in a row; and
    a bracket made of a metal material having one side that is open to accommodate the plurality of magnets.

18. The mobile terminal of claim 1, wherein a partial region of the flexible display is cut to form a recessed area, and
    a camera is located in the recessed region of the display.

19. The mobile terminal of claim 1, wherein the plurality of bodies configures to fold such that two different parts of the flexible display face each other in the second state.

* * * * *